United States Patent
An et al.

(10) Patent No.: US 11,197,018 B2
(45) Date of Patent: Dec. 7, 2021

(54) INTER-FRAME PREDICTION METHOD AND APPARATUS

(71) Applicant: HUAWEI TECHNOLOGIES CO., LTD., Guangdong (CN)

(72) Inventors: Jicheng An, Shenzhen (CN); Yu Han, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/728,264

(22) Filed: Dec. 27, 2019

(65) Prior Publication Data
US 2020/0137412 A1    Apr. 30, 2020

Related U.S. Application Data

(63) Continuation of application No. PCT/CN2017/091298, filed on Jun. 30, 2017.

(51) Int. Cl.
*H04N 19/52* (2014.01)
*H04N 19/58* (2014.01)

(52) U.S. Cl.
CPC .............. *H04N 19/52* (2014.11); *H04N 19/58* (2014.11)

(58) Field of Classification Search
None
See application file for complete search history.

(56) References Cited

U.S. PATENT DOCUMENTS 5,206,723 A * 4/1993 Parke ..................... G06T 7/231
                                                            375/240.12
6,148,109 A * 11/2000 Boon ................... H04N 19/154
                                                              382/238

(Continued)

FOREIGN PATENT DOCUMENTS

CN        101090491 A      12/2007
CN        101911707 A      12/2010

(Continued)

OTHER PUBLICATIONS

L. Grigoriu, "Spatio-temporal compression of the motion field in video coding," 2001 IEEE Fourth Workshop on Multimedia Signal Processing (Cat. No. 01TH8564), Cannes, 2001, pp. 129-134, doi: 10.1109/MMSP.2001.962723.*

(Continued)

*Primary Examiner* — Mohammad J Rahman
(74) *Attorney, Agent, or Firm* — Huawei Technologies Co., Ltd.

(57) ABSTRACT

A method for predicting motion information of a picture block includes: obtaining motion information of at least one determined motion vector picture block in a picture in which a to-be-processed picture block is located, where the at least one determined motion vector picture block includes a determined motion vector picture block discontiguous to the to-be-processed picture block; obtaining first identification information, where the first identification information is used to determine target motion information from the motion information of the at least one determined motion vector picture block; and predicting motion information of the to-be-processed picture block based on the target motion information.

14 Claims, 14 Drawing Sheets

(56) References Cited

U.S. PATENT DOCUMENTS

| | | | | |
|---|---|---|---|---|
| 6,519,287 | B1* | 2/2003 | Hawkins | H04N 19/583 375/240.16 |
| 7,088,772 | B2* | 8/2006 | Kim | H04N 19/56 375/240.12 |
| 8,503,530 | B2* | 8/2013 | Miao | H04N 19/573 375/240.16 |
| 8,902,359 | B1* | 12/2014 | Biswas | H04N 7/0137 348/452 |
| 9,654,760 | B2* | 5/2017 | Koyama | H04N 19/55 |
| 9,888,237 | B2* | 2/2018 | Tourapis | H04N 19/577 |
| 2001/0031004 | A1* | 10/2001 | Kim | H04N 19/51 375/240.16 |
| 2005/0053137 | A1* | 3/2005 | Holcomb | H04N 19/159 375/240.16 |
| 2008/0117977 | A1* | 5/2008 | Lee | H04N 19/56 375/240.16 |
| 2008/0247462 | A1* | 10/2008 | Demos | H04N 19/597 375/240.03 |
| 2008/0292000 | A1* | 11/2008 | Chappalli | H04N 19/513 375/240.16 |
| 2009/0003447 | A1* | 1/2009 | Christoffersen | H04N 19/192 375/240.16 |
| 2009/0225845 | A1* | 9/2009 | Veremeev | H04N 19/436 375/240.16 |
| 2009/0274215 | A1* | 11/2009 | Metsugi | H04N 19/423 375/240.16 |
| 2009/0290809 | A1* | 11/2009 | Yamada | G06T 7/215 382/266 |
| 2010/0103323 | A1* | 4/2010 | Wredenhagen | H04N 19/533 348/699 |
| 2010/0284469 | A1 | 11/2010 | Sato et al. | |
| 2010/0322315 | A1* | 12/2010 | Hasuo | H04N 19/51 375/240.16 |
| 2012/0155540 | A1* | 6/2012 | Jagannathan | H04N 19/119 375/240.16 |
| 2013/0136178 | A1* | 5/2013 | Sasai | H04N 19/103 375/240.12 |
| 2013/0208792 | A1* | 8/2013 | He | H04N 19/187 375/240.12 |
| 2014/0105293 | A1* | 4/2014 | George | H04N 19/13 375/240.12 |
| 2014/0140408 | A1 | 5/2014 | Lee et al. | |
| 2015/0085943 | A1* | 3/2015 | Taniguchi | H04N 5/145 375/240.29 |
| 2015/0146776 | A1* | 5/2015 | Koyama | H04N 19/593 375/240.03 |
| 2016/0142726 | A1* | 5/2016 | Han | H04N 19/176 375/240.12 |
| 2016/0142728 | A1 | 5/2016 | Wang et al. | |
| 2016/0219278 | A1 | 7/2016 | Chen et al. | |
| 2016/0241835 | A1* | 8/2016 | Ikai | H04N 13/128 |
| 2017/0085899 | A1 | 3/2017 | Oh et al. | |
| 2017/0134734 | A1* | 5/2017 | Wu | H04N 19/154 |
| 2017/0163986 | A1* | 6/2017 | Jacobson | H04N 19/593 |
| 2017/0223350 | A1* | 8/2017 | Xu | H04N 19/139 |
| 2017/0223377 | A1* | 8/2017 | Bankoski | H04N 19/136 |
| 2018/0131933 | A1* | 5/2018 | Tourapis | H04N 19/52 |
| 2018/0131943 | A1* | 5/2018 | Park | H04N 19/122 |
| 2018/0160113 | A1* | 6/2018 | Jeong | H04N 19/593 |
| 2018/0288356 | A1* | 10/2018 | Ray | H04N 19/124 |
| 2018/0288408 | A1* | 10/2018 | Ikai | H04N 19/126 |
| 2019/0215513 | A1* | 7/2019 | Tourapis | H04N 19/573 |

FOREIGN PATENT DOCUMENTS

| | | |
|---|---|---|
| CN | 103370940 A | 10/2013 |
| CN | 103404149 A | 11/2013 |
| CN | 103733625 A | 4/2014 |
| CN | 103841426 A | 6/2014 |
| CN | 104243982 A | 12/2014 |
| CN | 104427345 A | 3/2015 |
| CN | 104602023 A | 5/2015 |
| JP | 2000333184 A | 11/2000 |
| KR | 20140064944 A | 5/2014 |
| KR | 20140124920 A | 10/2014 |
| WO | 2014058796 A1 | 4/2014 |

OTHER PUBLICATIONS

Benjamin Brossa et al. Block Merging for Quadtree-Based Partitioning in HEVC, Proc. of SPIE vol. 8499, 2012. pp. 84990R-1-84990R-9.

ITU-T H.263, Implementors' Guide, Series H: Audiovisual and Multimedia Systems Coding of moving video. Implementors Guide for H.263: "Video coding for low bit rate communication". Aug. 5, 2005, 10 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

ITU-T H.265(Dec. 2016), Series H: Audiovisual and Multimedia Systems, Infrastructure of audiovisual services—Coding of moving video, High efficiency video coding, Dec. 2016. total 664 pages.

Ka-Ho Ng et al, A New Motion Compensation Method Using Superimposed Inter-Frame Signals, ICASSP 2012, 4 pages.

Wang Li-Ii et al, Fast motion estimation algorithm for H. 264 with multi-references, Journal of Computer Applications, vol. 29 No. 5, May 2009, 4 pages.

* cited by examiner

Original merge candidate predictive motion vector list

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

Add a zero motion vector

Candidate predictive motion vector list to which a "0" motion vector is added

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | (0, 0), ref0 | (0, 0), ref0 |
| 4 | (0, 0), ref1 | (0, 0), ref1 |

INTER-FRAME PREDICTION METHOD AND APPARATUS

CROSS-REFERENCE TO RELATED APPLICATIONS

This application is a continuation of International Application No. PCT/CN2017/091298, filed on Jun. 30, 2017, the disclosure of which is hereby incorporated by reference in its entirety.

TECHNICAL FIELD

This application relates to the field of video picture technologies, and in particular, to an inter-frame prediction method and apparatus.

BACKGROUND

Digital video capabilities can be incorporated into a wide range of apparatuses, including a digital television, a digital direct broadcast system, a wireless broadcast system, a personal digital assistant (PDA), a laptop or desktop computer, a tablet computer, an e-book reader, a digital camera, a digital recording apparatus, a digital media player, a video gaming apparatus, a video game console, a cellular or satellite radio telephone, a video conference apparatus, a video streaming apparatus, and the like. A digital video apparatus implements video compression technologies, for example, video compression technologies described in standards defined by MPEG-2, MPEG-4, ITU-T H.263, ITU-T H.264/MPEG-4 Part 10: advanced video coding (AVC), and ITU-T H.265: high efficiency video coding (HEVC) standards and extension parts of the standards, to more efficiently transmit and receive digital video information. The video apparatus may transmit, receive, code, decode, and/or store the digital video information more efficiently by implementing these video coding/decoding technologies.

The video compression technologies are used to perform spatial (intra-picture) prediction and/or temporal (inter-picture) prediction to reduce or remove inherent redundancy in video sequences. For block-based video decoding, a video may be partitioned into video blocks, and the video block may also be referred to as a tree block, a coding unit (CU), and/or a decoding node. A video block in a to-be-intra-frame-decoded (I) slice of a picture is coded through spatial prediction based on a reference sample in a neighboring block in a same picture. For a video block in a to-be-inter-frame-decoded (P or B) slice of a picture, spatial prediction based on a reference sample in a neighboring block in the same picture or temporal prediction based on a reference sample in another reference picture may be used. The picture may be referred to as a frame, and the reference picture may be referred to as a reference frame.

SUMMARY

Embodiments of this application provide an inter-frame prediction method and apparatus, to select an appropriate candidate motion vector as a motion vector predictor of a to-be-processed picture block. This improves validity of motion vector prediction, and improves coding and decoding efficiency.

A first aspect of this application provides a method for predicting motion information of a picture block, the motion information is used for inter-frame prediction, and the method includes: obtaining motion information of at least one determined motion vector picture block in a picture in which a to-be-processed picture block is located, where the at least one determined motion vector picture block includes a determined motion vector picture block discontiguous to the to-be-processed picture block; obtaining first identification information, where the first identification information is used to determine target motion information from the motion information of the at least one determined motion vector picture block; and predicting motion information of the to-be-processed picture block based on the target motion information.

A beneficial effect of this implementation is as follows: By using a candidate prediction mode in which a motion vector of a spatially discontiguous picture block is used as a candidate predictive motion vector of a to-be-processed block, more spatial prior coding information is used, and coding performance is improved.

In a feasible implementation of the first aspect, that the picture in which the to-be-processed picture block is located includes at least two rows of coding tree units (CTU), and a size of the to-be-processed picture block is not larger than a size of the coding tree unit includes: a difference between a number of a row of a coding tree unit in which the to-be-processed picture block is located in the picture and a number of a row of a coding tree unit in which the determined motion vector picture block is located in the picture is smaller than N rows, where N is an integer greater than 1.

In a feasible implementation of the first aspect, N is 2.

A beneficial effect of this implementation is as follows: A position of a basic pixel unit is limited within a specified range, so that an excessive storage or access operation of a motion vector can be avoided, and data processing efficiency is improved while specific coding performance is maintained.

In a feasible implementation of the first aspect, the picture in which the to-be-processed picture block is located includes M groups of the determined motion vector picture blocks, each group of the determined motion vector picture blocks has a group number, a width of the to-be-processed picture block is w and a height is h, and the obtaining motion information of at least one determined motion vector picture block in a picture in which a to-be-processed picture block is located includes: successively obtaining the motion information of the to-be-obtained determined motion vector picture blocks in ascending order of group numbers of the to-be-obtained determined motion vector picture blocks, where determined motion vector picture blocks of a group number i include determined motion vector picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction.

In a feasible implementation of the first aspect, when at least two to-be-obtained determined motion vector picture blocks have a same group number, the successively obtaining motion information of the to-be-obtained determined motion vector picture block includes: successively obtaining motion information of the at least two to-be-obtained determined motion vector picture blocks in ascending order of distances from the at least two to-be-obtained determined motion vector picture blocks to the origin, where the distance is a sum of a horizontal coordinate absolute value and a vertical coordinate absolute value of a pixel set basic unit in a preset position in the to-be-obtained determined motion vector picture block in the virtual coordinate system.

In a feasible implementation of the first aspect, the obtaining motion information of at least one determined motion vector picture block in a picture in which a to-be-processed picture block is located includes: successively obtaining motion information of determined motion vector picture blocks in which pixel set basic units in the following coordinate positions in the virtual coordinate system are located: (−w, 0), (0, −h), (1, −h), (−w, 1), (−w, −h), (−2×w, 0), (0, −2×h), (1, −2×h), (−2×w, 1), (−w, −2×h), (−2×w, −h), (−2×w, h+1), (w+1, −2×h), (−2×w, −2×h), (−3×w, 0), (0, −3×h), (1, −3×h), (−3×w, 1), (−w, −3×h), (−3×w, −h), (w+1, −3×h), (−3×w, h+1), (−2×w, −3×h), (−3×w, −2×h), (2×w+1, −3×h), (−3×w, 2×h+1), and (−3×w, −3×h).

A beneficial effect of this implementation is as follows: Candidate predictive motion vectors are represented in a variable-length coding manner, a candidate predictive motion vector with higher ranking is coded by using a shorter codeword, and a candidate predictive motion vector with lower ranking is coded by using a longer codeword. An order of obtaining the candidate predictive motion vectors is properly determined based on a correlation between the motion information of the determined motion vector picture block and the motion information of the to-be-processed picture block. This helps to select a better codeword coding scheme, and improve coding performance.

In a feasible implementation of the first aspect, before the obtaining motion information of the to-be-obtained determined motion vector picture block each time, the method further includes: determining that the motion information of the to-be-obtained determined motion vector picture block is different from motion information of all obtained determined motion vector picture blocks.

In a feasible implementation of the first aspect, the obtaining motion information of at least one determined motion vector picture block in a picture in which the to-be-processed picture block is located includes: obtaining motion information of a preset quantity of the determined motion vector picture blocks.

In a feasible implementation of the first aspect, the predicting motion information of the to-be-processed picture block based on the target motion information includes: using the target motion information as the motion information of the to-be-processed picture block.

In a feasible implementation of the first aspect, the motion information includes a motion vector, and the predicting motion information of the to-be-processed picture block based on the target motion information includes: obtaining second identification information, where the second identification information is used to indicate a motion vector prediction residual value of the to-be-processed picture block; and using a sum of a motion vector in the target motion information and the motion vector prediction residual value as a motion vector of the to-be-processed picture block.

In a feasible implementation of the first aspect, the method is used to decode the to-be-processed picture block, and the obtaining first identification information includes: parsing a bitstream to obtain the first identification information.

In a feasible implementation of the first aspect, after the parsing a bitstream to obtain the first identification information, the method further includes: determining the target motion information from the motion information of the at least one determined motion vector picture block based on the first identification information.

In a feasible implementation of the first aspect, the method is used to code the to-be-processed picture block, and the obtaining first identification information includes: determining the target motion information from the motion information of the at least one determined motion vector picture block, where a smallest rate-distortion cost is used for coding the to-be-processed picture block by using the target motion information.

In a feasible implementation of the first aspect, after the determining the target motion information from the motion information of the at least one determined motion vector picture block, the method further includes: coding the first identification information into a bitstream.

In the plurality of feasible implementations, the motion vector prediction method in this application is separately applied to a decoding method and a coding method for obtaining the motion vector of the to-be-processed picture block, a merge prediction mode, and an advanced motion vector prediction (AMVP) mode. This improves coding performance and efficiency of the original method.

In a feasible implementation of the first aspect, the determining the target motion information from the motion information of the at least one determined motion vector picture block includes: using one piece in the motion information of the at least one determined motion vector picture block as the target motion information, or using a combination of at least two pieces in the motion information of the at least one determined motion vector picture block as the target motion information.

A beneficial effect of this implementation is as follows: New candidate predicted motion information is generated by combining original motion information. This enriches candidate predicted motion information and improves prediction efficiency.

A second aspect of this application provides an apparatus for predicting motion information of a picture block, the motion information is used for inter-frame prediction, and the apparatus includes: a motion information obtaining unit, configured to obtain motion information of at least one determined motion vector picture block in a picture in which a to-be-processed picture block is located, where the at least one determined motion vector picture block includes a determined motion vector picture block discontiguous to the to-be-processed picture block; an identification information obtaining unit, configured to obtain first identification information, where the first identification information is used to determine target motion information from the motion information of the at least one determined motion vector picture block; and a prediction unit, configured to predicting motion information of the to-be-processed picture block based on the target motion information.

In a feasible implementation of the second aspect, that the picture in which the to-be-processed picture block is located includes at least two rows of coding tree units, and a size of the to-be-processed picture block is not larger than a size of the coding tree unit includes: a difference between a number of a row of a coding tree unit in which the to-be-processed picture block is located in the picture and a number of a row of a coding tree unit in which the determined motion vector picture block is located in the picture is smaller than N rows, where N is an integer greater than 1.

In a feasible implementation of the second aspect, N is 2.

In a feasible implementation of the second aspect, the picture in which the to-be-processed picture block is located includes M groups of the determined motion vector picture blocks, each group of the determined motion vector picture blocks has a group number, a width of the to-be-processed picture block is w and a height is h, and the motion information obtaining unit is configured to: successively obtain the motion information of the to-be-obtained determined motion vector picture blocks in ascending order of group numbers of the to-be-obtained determined motion vector picture blocks, where determined motion vector picture blocks of a group number i include determined motion vector picture blocks in which pixel set basic units in the following coordinate positions in a virtual coordinate system are located: (−i×w, −i×h), (1+m×w, −i×h), (−m×w, −i×h), (−i×w, −m×h), and (−i×w, m×h+1), m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction.

In a feasible implementation of the second aspect, when at least two to-be-obtained determined motion vector picture blocks have a same group number, the motion information obtaining unit is configured to: successively obtain motion information of the at least two to-be-obtained determined motion vector picture blocks in ascending order of distances from the at least two to-be-obtained determined motion vector picture blocks to the origin, where the distance is a sum of a horizontal coordinate absolute value and a vertical coordinate absolute value of a pixel set basic unit in a preset position in the to-be-obtained determined motion vector picture block in the virtual coordinate system.

In a feasible implementation of the second aspect, the motion information obtaining unit is configured to: successively obtain motion information of determined motion vector picture blocks in which pixel set basic units in the following coordinate positions in the virtual coordinate system are located: (−w, 0), (0, −h), (1, −h), (−w, 1), (−w, −h), (−2×w, 0), (0, −2×h), (1, −2×h), (−2×w, 1), (−w, −2×h), (−2×w, −h), (−2×w, h+1), (w+1, −2×h), (−2×w, −2×h), (−3×w, 0), (0, −3×h), (1, −3×h), (−3×w, 1), (−w, −3×h), (−3×w, −h), (w+1, −3×h), (−3×w, h+1), (−2×w, −3×h), (−3×w, −2×h), (2×w+1, −3×h), (−3×w, 2×h+1), and (−3×w, −3×h).

In a feasible implementation of the second aspect, before obtaining the motion information of the to-be-obtained determined motion vector picture block each time, the motion information obtaining unit is further configured to determine that the motion information of the to-be-obtained determined motion vector picture block is different from motion information of all obtained determined motion vector picture blocks.

In a feasible implementation of the second aspect, the motion information obtaining unit is configured to obtain motion information of a preset quantity of determined motion vector picture blocks.

In a feasible implementation of the second aspect, the prediction unit is configured to use the target motion information as the motion information of the to-be-processed picture block.

In a feasible implementation of the second aspect, the identification information obtaining unit is further configured to obtain second identification information, where the second identification information is used to indicate a motion vector prediction residual value of the to-be-processed picture block; and the prediction unit is configured to use a sum of a motion vector in the target motion information and the motion vector prediction residual value as a motion vector of the to-be-processed picture block.

In a feasible implementation of the second aspect, the apparatus is configured to decode the to-be-processed picture block, and the identification information obtaining unit is configured to parse a bitstream to obtain the first identification information.

In a feasible implementation of the second aspect, after parsing the bitstream to obtain the first identification information, the identification information obtaining unit is further configured to determine the target motion information from the motion information of the at least one determined motion vector picture block based on the first identification information.

In a feasible implementation of the second aspect, the apparatus is configured to code the to-be-processed picture block, and the identification information obtaining unit is configured to determine the target motion information from the motion information of the at least one determined motion vector picture block, where a smallest rate-distortion cost is used for coding the to-be-processed picture block by using the target motion information.

In a feasible implementation of the second aspect, after determining the target motion information from the motion information of the at least one determined motion vector picture block, the identification information obtaining unit is further configured to code the first identification information into a bitstream.

In a feasible implementation of the second aspect, the identification information obtaining unit is configured to: use one piece in the motion information of the at least one determined motion vector picture block as the target motion information, or use a combination of at least two pieces in the motion information of the at least one determined motion vector picture block as the target motion information.

A third aspect of this application provides an apparatus for predicting motion information of a picture block, the motion information is used for inter-frame prediction, and the apparatus includes: a processor and a memory coupled to the processor. The processor is configured to: obtain motion information of at least one determined motion vector picture block in a picture in which a to-be-processed picture block is located, where the at least one determined motion vector picture block includes a determined motion vector picture block discontiguous to the to-be-processed picture block; obtain first identification information, where the first identification information is used to determine target motion information from the motion information of the at least one determined motion vector picture block; and predict motion information of the to-be-processed picture block based on the target motion information.

In a feasible implementation of the third aspect, that the picture in which the to-be-processed picture block is located includes at least two rows of coding tree units, and a size of the to-be-processed picture block is not larger than a size of the coding tree unit includes: a difference between a number of a row of a coding tree unit in which the to-be-processed picture block is located in the picture and a number of a row of a coding tree unit in which the determined motion vector picture block is located in the picture is smaller than N rows, where N is an integer greater than 1.

In a feasible implementation of the third aspect, N is 2.

In a feasible implementation of the third aspect, the picture in which the to-be-processed picture block is located includes M groups of the determined motion vector picture blocks, each group of the determined motion vector picture blocks has a group number, a width of the to-be-processed picture block is w and a height is h, and the processor is configured to: successively obtain the motion information of the to-be-obtained determined motion vector picture blocks in ascending order of group numbers of the to-be-obtained determined motion vector picture blocks, where determined motion vector picture blocks of a group number i include determined motion vector picture blocks in which pixel set basic units in the following coordinate positions in a virtual coordinate system are located: (−i×w, −i×h), (1+m×w, −i×h), (−m×w, −i×h), (−i×w, −m×h), and (−i×w, m×h+1), m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction.

In a feasible implementation of the third aspect, when at least two to-be-obtained determined motion vector picture blocks have a same group number, the processor is configured to: successively obtain motion information of the at least two to-be-obtained determined motion vector picture blocks in ascending order of distances from the at least two to-be-obtained determined motion vector picture blocks to the origin, where the distance is a sum of a horizontal coordinate absolute value and a vertical coordinate absolute value of a pixel set basic unit in a preset position in the to-be-obtained determined motion vector picture block in the virtual coordinate system.

In a feasible implementation of the third aspect, the processor is configured to: successively obtain motion information of determined motion vector picture blocks in which pixel set basic units in the following coordinate positions in the virtual coordinate system are located: (−w, 0), (0, −h), (1, −h), (−w, 1), (−w, −h), (−2×w, 0), (0, −2×h), (1, −2×h), (−2×w, 1), (−w, −2×h), (−2×w, −h), (−2×w, h+1), (w+1, −2×h), (−2×w, −2×h), (−3×w, 0), (0, −3×h), (1, −3×h), (−3×w, 1), (−w, −3×h), (−3×w, −h), (w+1, −3×h), (−3×w, h+1), (−2×w, −3×h), (−3×w, −2×h), (2×w+1, −3×h), (−3×w, 2×h+1), and (−3×w, −3×h).

In a feasible implementation of the third aspect, before obtaining the motion information of the to-be-obtained determined motion vector picture block each time, the processor is further configured to determine that the motion information of the to-be-obtained determined motion vector picture block is different from motion information of all obtained determined motion vector picture blocks.

In a feasible implementation of the third aspect, the processor is configured to obtain motion information of a preset quantity of determined motion vector picture blocks.

In a feasible implementation of the third aspect, the processor is configured to use the target motion information as the motion information of the to-be-processed picture block.

In a feasible implementation of the third aspect, the processor is further configured to: obtain second identification information, where the second identification information is used to indicate a motion vector prediction residual value of the to-be-processed picture block; and use a sum of a motion vector in the target motion information and the motion vector prediction residual value as a motion vector of the to-be-processed picture block.

In a feasible implementation of the third aspect, the apparatus is configured to decode the to-be-processed picture block, and the processor is configured to parse a bitstream to obtain the first identification information.

In a feasible implementation of the third aspect, after parsing the bitstream to obtain the first identification information, the processor is further configured to determine the target motion information from the motion information of the at least one determined motion vector picture block based on the first identification information.

In a feasible implementation of the third aspect, the apparatus is configured to code the to-be-processed picture block, and the processor is configured to determine the target motion information from the motion information of the at least one determined motion vector picture block, where a smallest rate-distortion cost is used for coding the to-be-processed picture block by using the target motion information.

In a feasible implementation of the third aspect, after determining the target motion information from the motion information of the at least one determined motion vector picture block, the processor is further configured to code the first identification information into a bitstream.

In a feasible implementation of the third aspect, the processor is configured to: use one piece in the motion information of the at least one determined motion vector picture block as the target motion information, or use a combination of at least two pieces in the motion information of the at least one determined motion vector picture block as the target motion information.

A fourth aspect of this application provides a computer readable storage medium. The computer readable storage medium stores an instruction. When the instruction is run on a computer, the computer is enabled to perform the method in the first aspect.

A fifth aspect of this application provides a computer program product including an instruction. When the computer program product is run on a computer, the computer is enabled to perform the method in the first aspect.

It should be understood that, the technical solutions in the second aspect to the fifth aspect of this application are consistent with that in the first aspect of this application. Beneficial effects achieved by the various aspects and corresponding feasible implementations are similar, and details are not described again.

DESCRIPTION OF EMBODIMENTS

The following clearly describes the technical solutions in the embodiments of this application with reference to the accompanying drawings in the embodiments of this application.

Figure 1:
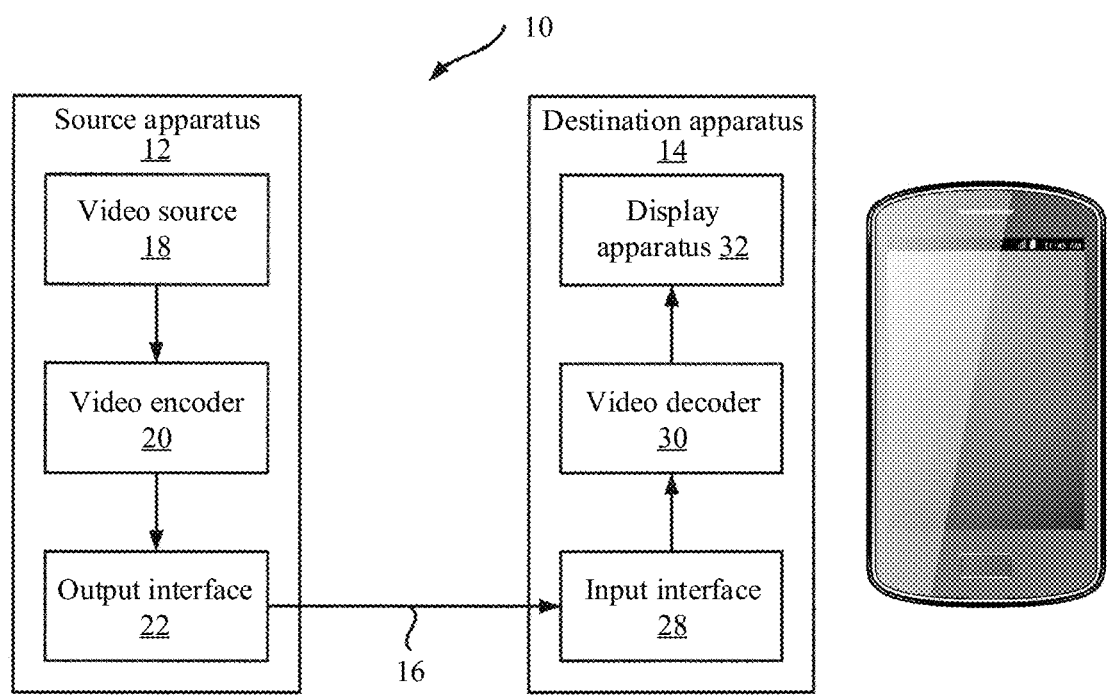
FIG. 1 is a schematic block diagram of a video coding and decoding system according to an embodiment of this application.

FIG. 1 is a schematic block diagram of a video coding and decoding system 10 according to an embodiment of this application. As shown in FIG. 1, the system 10 includes a source apparatus 12, and the source apparatus 12 generates coded video data to be decoded by a destination apparatus 14. The source apparatus 12 and the destination apparatus 14 each may include any one of a wide range of apparatuses, including a desktop computer, a laptop computer, a tablet computer, a set-top box, a mobile phone such as a "smart" phone, a "smart" touch panel, a television, a camera, a display apparatus, a digital media player, a video gaming console, a video streaming transmission apparatus, and the like. In some applications, the source apparatus 12 and the destination apparatus 14 may be equipped for wireless communication.

The destination apparatus 14 may receive to-be-decoded coded video data through a link 16. The link 16 may include any kind of medium or apparatus capable of transmitting the coded video data from the source apparatus 12 to the destination apparatus 14. In a feasible implementation, the link 16 may include a communication medium enabling the source apparatus 12 to directly transmit the coded video data to the destination apparatus 14 in real time. The coded video data can be modulated according to a communications standard (for example, a wireless communications protocol) and transmitted to the destination apparatus 14. The communication medium may include any wireless or wired communication medium, for example, a radio frequency spectrum or one or more physical transmission lines. The communication medium may be a part of a packet-based network (for example, a local area network, a wide area network, or a global network of the Internet). The communication medium may include a router, a switch, a base station, or any other device helpful for facilitating communication from the source apparatus 12 to the destination apparatus 14.

Alternatively, coded data may be output to a storage apparatus 24 through an output interface 22. Similarly, the coded data may be accessed from the storage apparatus 24 through an input interface. The storage apparatus 24 may include any one of a plurality of disperse or local data storage media, for example, a hard disk drive, a Blu-ray disc, a DVD, a CD-ROM, a flash memory, a volatile or non-volatile storage, or any other appropriate digital storage medium used for storing the coded video data. In another feasible implementation, the storage apparatus 24 may correspond to a file server or another intermediate storage apparatus capable of storing a coded video generated by the source apparatus 12. The destination apparatus 14 may access the stored video data from the storage apparatus 24 through streaming transmission or downloading transmission. The file server may be any type of server capable of storing the coded video data and transmitting the coded video data to the destination apparatus 14. In a feasible implementation, the file server includes a website server, a file transfer protocol server, a network-attached storage apparatus, or a local disk drive. The destination apparatus 14 may access the coded video data through any standard data connection including an Internet connection. The data connection may include a wireless channel (for example, a Wi-Fi connection), a wired connection (for example, a cable modem), or a combination thereof; that is suitable for accessing the coded video data stored in the file server. Transmission of the coded video data from the storage apparatus 24 may be streaming transmission, downloading transmission, or a combination thereof.

Technologies in this application are not necessarily limited to wireless applications or settings. The technologies can be applied to video decoding, to support any one of a plurality of multimedia applications, for example, over-the-air television broadcasting, cable television transmission, satellite television transmission, streaming video transmission (for example, through the Internet), digital video coding for storage on a data storage medium, decoding of a digital video stored on a data storage medium, or another application. In some feasible implementations, the system 10 may be configured to support unidirectional or bidirectional video transmission, so as to support applications such as streaming video transmission, video playing, video broadcasting, and/or video calling.

In a feasible implementation of FIG. 1, the source apparatus 12 may include a video source 18, a video encoder 20, and the output interface 22. In some applications, the output interface 22 may include a modulator/demodulator (a modem) and/or a transmitter. In the source apparatus 12, the video source 18 may include, for example, a source of the following: a video capturing apparatus (for example, a video camera), a video archive including a previously captured video, a video feed-in interface for receiving a video from a video content provider, and/or a computer graphics system for generating computer graphics data as a source video, or a combination thereof. In a feasible implementation, if the video source 18 is a video camera, the source apparatus 12 and the destination apparatus 14 can constitute a so-called camera phone or a video phone. The technologies described in this application may be, for example, applied to video decoding, and may be applied to wireless and/or wired applications.

The video encoder 20 may code a captured, pre-captured, or calculated video. The coded video data may be directly transmitted to the destination apparatus 14 through the output interface 22 of the source apparatus 12. The coded video data may also (or alternatively) be stored on the storage apparatus 24 for subsequent access by the destination apparatus 14 or another apparatus for decoding and/or playing.

The destination apparatus 14 includes the input interface 28, a video decoder 30, and a display apparatus 32. In some applications, the input interface 28 may include a receiver and/or a modem. The input interface 28 of the destination apparatus 14 receives the coded video data through the link 16. The coded video data transmitted or provided to the storage apparatus 24 through the link 16 may include a plurality of syntactic elements generated by the video encoder 20 for the video decoder 30 to decode the video data. These syntactic elements may be included in the coded video data transmitted on the communication medium, stored in the storage medium or stored in the file server.

The display apparatus 32 may be integrated with the destination apparatus 14 or disposed outside the destination apparatus 14. In some feasible implementations, the destination apparatus 14 may include an integrated display apparatus and also be configured to connect to an interface of an external display apparatus. In other feasible implementations, the destination apparatus 14 may be a display apparatus. Generally, the display apparatus 32 displays decoded video data to a user, and may include any one of a plurality of display apparatuses, for example, a liquid crystal display, a plasma display, an organic light-emitting diode display, or another type of display apparatus.

The video encoder 20 and the video decoder 30 may operate according to, for example, a next-generation video coding and decoding compression standard (H.266) currently in development, and may comply with the H.266 test model (JEM). Alternatively, the video encoder 20 and the video decoder 30 may operate according to, for example, other dedicated or industrial standards or their extensions of the ITU-T H.265 standard or the ITU-T H.264 standard, where the ITU-T H.265 standard is also referred to as the high efficiency video decoding standard, and the ITU-T H.264 standard is alternatively referred to as MPEG-4 Part 10 or AVC. However, the technologies of this application are not limited to any particular decoding standard. Other feasible implementations of video compression standards include the MPEG-2 and the ITU-TH.263.

Although not shown in FIG. 1, in some aspects, the video encoder 20 and the video decoder 30 may be integrated with an audio encoder and an audio decoder, respectively, and may include an appropriate multiplexer-demultiplexer (MUX-DEMUX) unit or other hardware and software to code both audio and video in a common data stream or a separate data stream. If applicable, the MUX-DEMUX unit may comply with the ITU H.223 multiplexer protocol or other protocols such as the user datagram protocol (UDP) in some feasible implementations.

The video encoder 20 and the video decoder 30 may be implemented in any one of a plurality of appropriate encoder circuit, for example, one or more microprocessors, digital signal processors (DSP), application-specific integrated circuits (ASIC), field-programmable gate arrays (FPGA), discrete logic, software, hardware, firmware, or any combination thereof. When the technologies are implemented partially in software, an apparatus may store instructions for the software in an appropriate non-transitory computer readable medium, and execute the instructions in a form of hardware by using one or more processors, to implement the technologies of this application. Either of the video encoder 20 and the video decoder 30 may be included in one or more encoders or decoders, and either of the video encoder 20 and the video decoder 30 may be integrated as a part of a combined encoder/decoder (CODEC) in a corresponding apparatus.

This application may, for example, involve "signaling", by the video encoder 20, specific information to another apparatus such as the video decoder 30. However, it should be understood that the video encoder 20 may associate a specific syntactic element with coded parts of video data, to signal information. In other words, the video encoder 20 may store the specific syntactic element in header information of the coded parts of the video data, to "signal" data. In some applications, the syntactic element may be coded and stored (for example, stored into a storage system 34 or a file server 36) before being received and decoded by the video decoder 30. Therefore, the term "signal" may mean, for example, transmission of syntactic data or other data used for decoding compressed video data, regardless of whether the transmission is in real time, nearly in real time, or within a time period. For example, the transmission may be performed when the syntactic element is stored into a medium during coding, and then the syntactic element may be retrieved by a decoding apparatus at any time after being stored into the medium.

The JCT-VC developed the H.265 (HEVC) standard. HEVC standardization is based on an evolved model of a video decoding apparatus called an HEVC test model (HM). The latest H.265 standard documentation is available at http://www.itu.int/rec/r-REC-H.265. The latest version of the standard documentation is H.265 (12/16), which is incorporated herein by reference in its entirety. The HM assumes that the video decoding apparatus has several additional capabilities with respect to existing algorithms of the ITU-TH.264/AVC. For example, H.264 provides nine intra-frame prediction coding modes, whereas HM can provide up to 35 intra-frame prediction coding modes.

The JVET is committed to developing the H.266 standard. An H.266 standardization process is based on an evolved model of a video decoding apparatus called an H.266 test model. H.266 algorithm descriptions are available at http://phenix.int-evry.fr/jvet, and the latest algorithm descriptions are included in JVET-F1001-v2. This algorithm description document is incorporated herein by reference in its entirety. In addition, reference software for a JEM test model is available at https://jvet.hhi.fraunhofer.delsvn/svn_HMJEMSofware/, which is also incorporated herein by reference in its entirety.

Generally, in an HM working model description, a video frame or picture may be divided into a sequence of tree blocks including both luminance and chrominance samples or a sequence of largest coding units (LCU), and LCU is also referred to as CTU. A tree block has purposes similar to a macroblock in the H.264 standard. A slice includes several consecutive tree blocks in decoding order. A video frame or picture may be partitioned into one or more slices. Each tree block can be split into coding units according to a quadtree. For example, a tree block acting as a root node of a quadtree may be split into four child nodes, and each child node may act as a parent node and be split into four other child nodes. A final non-splittable child node acting as a leaf node of the quadtree includes a decoding node, for example, a decoded video block. Syntactic data associated with a decoded bitstream may define a maximum quantity of splitting times of a tree block, and may also define a minimum size of a decoding node.

A coding unit includes a decoding node, a prediction unit (PU), and a transform unit (TU) associated with the decoding node. A CU size corresponds to a decoding node size, and the CU needs to be in a square shape. The CU size may range from 8×8 pixels to a maximum of 64×64 pixels or a larger tree block. Each CU may include one or more PUs and one or more TUs. For example, syntactic data associated with the CU may describe partitioning of one CU into one or more PUs. Partitioning patterns may vary when the CU is coded in a skip or direct mode, coded in an intra-frame prediction mode, or coded in an inter-frame prediction mode. A PU may be partitioned into a non-square shape. For example, the syntactic data associated with the CU may also describe partitioning of one CU into one or more TUs according to the quadtree. A TU may be in a square or non-square shape.

The HEVC standard allows TU-based transformation, and TUs may be different for different CUs. A TU size is typically set based on a size of a PU within a given CU defined for a partitioned LCU. However, a case may not always be like this. The TU size is typically the same as or smaller than a PU size. In some feasible implementations, a quadtree structure that is referred to as a "residual quadtree" (RQT) may be used to divide a residual sample corresponding to the CU into smaller units. A leaf node of the RQT may be referred to as a TU. Pixel difference values associated with the TU may be transformed to generate transform coefficients, and the transform coefficients may be quantized.

Generally, a PU includes data related to a prediction process. For example, when the PU is coded in an intra-frame mode, the PU may include data describing an intra-frame prediction mode of the PU. In another feasible implementation, when the PU is coded in an inter-frame mode, the PU may include data defining a motion vector of the PU. For example, the data defining the motion vector of the PU may describe a motion vector horizontal component, a motion vector vertical component, a resolution of the motion vector (for example, ¼ pixel precision or ⅛ pixel precision), a reference picture to which the motion vector is directed, and/or a reference picture list of the motion vector (for example, a list 0, a list 1, or a list C).

Generally, a TU uses transform and quantization processes. The given CU including one or more PUs may also include one or more TUs. After prediction, the video encoder 20 may calculate a residual value corresponding to the PU. The residual value includes a pixel difference, and the pixel difference may be transformed into a transform coefficient, and the transform coefficient is quantized, and subject to TU scanning to generate serialized transform coefficients for entropy decoding. In this application, the term "video block" is usually used to represent the decoding node of the CU. In some specific applications, this application may also use the term "video block" to represent a tree block including the decoding node, PU, and TU, for example, the LCU or CU.

A video sequence generally includes a series of video frames or pictures. For example, a group of pictures (GOP) includes a series of, one, or more video pictures. The GOP may include syntactic data included in header information of the GOP, in header information of one or more of the pictures, or elsewhere, and the syntactic data describes a quantity of pictures included in the GOP. Each slice of a picture may include slice syntactic data describing a coding mode of the corresponding picture. The video encoder 20 usually performs an operation on video blocks in some video slices, to code video data. A video block may correspond to a decoding node in a CU. A size of the video block may be fixed or changeable, and may vary with a specified decoding standard.

In a feasible implementation, the HM supports prediction for a variety of PU sizes. Assuming that a specific CU size is 2N×2N, the HM supports intra-frame prediction of a PU size of 2N×2N or N×N, and inter-frame prediction of a symmetric PU size of 2N×2N, 2N×N, N×2N, or N×N. The HM also supports asymmetric partitioning of inter-frame prediction of PU sizes of 2N×nU, 2N×nD, nL×2N, and nR×2N. In asymmetric partitioning, the CU is not partitioned in one direction, and is partitioned into 25% and 75% in the other direction. The CU portion corresponding to the 25% segment is indicated by an indicator including "n" followed by "U (Up)", "D (Down)", "L (Left)" or "R (Right)". Therefore, for example, "2N×nU" refers to 2N×2NCU that is partitioned horizontally with 2N×0.5NPU on the top and 2N×1.5NPU on the bottom.

In this application, "N×N" and "N multiplied by N" may be used interchangeably to indicate pixel sizes of a video block in a vertical dimension and a horizontal dimension, for example, 16×16 pixels or 16 multiplied by 16 pixels. Generally, a 16×16 block has 16 pixels (y=16) in a vertical direction and 16 pixels (x=16) in a horizontal direction. Similarly, an N×N block has N pixels in the vertical direction and N pixels in the horizontal direction, where N represents a non-negative integer. Pixels in a block may be arranged in rows and columns. In addition, a block does not necessarily have a same quantity of pixels in the horizontal direction and in the vertical direction. For example, a block may include N×M pixels, where M is not necessarily equal to N.

After intra-frame predictive or inter-frame predictive decoding of PUs in the CU, the video encoder 20 may calculate residual data of TUs in the CU. A PU may include pixel data in a spatial domain (also referred to as a pixel domain), and a TU may include a coefficient in a transform domain after transform (for example, discrete cosine transform (DCT), integer transform, wavelet transform, or other conceptually similar transform) is applied to residual video data. The residual data may correspond to a pixel difference between pixels of a picture not coded and a predictor corresponding to the PU. The video encoder 20 may generate a TU containing residual data of the CU, and then transform the TU to generate CU transform coefficients.

After performing any transform to generate transform coefficients, the video encoder 20 may quantize the transform coefficients. Quantization means, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value, where n is greater than m.

The JEM model further improves a video picture coding structure. Specifically, a block coding structure called a "quadtree plus binary tree" (QTBT) is introduced. Without using such concepts as a CU, a PU, and a TU in HEVC, the QTBT structure supports more flexible CU partitioning shapes. One CU may be in a square or rectangular shape. A CTU is first subject to quadtree partitioning, and further, binary tree partitioning is performed on leaf nodes of the quadtree. In addition, there are two binary tree partition modes: symmetric horizontal partitioning and symmetric vertical partitioning. A leaf node of the binary tree is referred to as a CU. A CU in the JEM cannot be further partitioned during prediction and transform. In other words, a CU, a PU, and a TU in the JEM have a same block size. In the current phase JEM, a maximum size of the CTU is 256×256 luminance pixels.

In some feasible implementations, the video encoder 20 may scan the quantized transform coefficient in a predefined scanning order to generate a serialized vector that can be entropy-coded. In some other feasible implementations, the video encoder 20 may perform adaptive scanning. After scanning the quantized transform coefficient to form a one-dimensional vector, the video encoder 20 may entropy-code the one-dimensional vector through context-adaptive variable-length coding (CAVLC), context-based adaptive binary arithmetic coding (CABAC), syntax-based context-adaptive binary arithmetic coding (SBAC), probability interval partitioning entropy (PIPE) coding or another entropy coding method. The video encoder 20 may also entropy-code the syntactic element associated with the coded video data for the video decoder 30 to decode the video data.

To perform CABAC, the video encoder 20 may assign a context in a context model to a to-be-transmitted symbol. The context may be related to whether a neighboring value of the symbol is non-zero. To perform CAVLC, the video encoder 20 may select a variable-length code of the to-be-transmitted symbol. A codeword in variable-length coding (VLC) may be constructed so that a shorter code corresponds to a more probable symbol, and a longer code corresponds to a less probable symbol. In this way, using the VLC can reduce a bitrate as compared to using codewords of an equal length for each to-be-transmitted symbol. Probability in CABAC can be determined based on the context assigned to the symbol.

In this embodiment of this application, the video encoder may perform inter-frame prediction to reduce time redundancy between pictures. As described above, a CU may have one or more prediction units PUs depending on stipulation of different video compression coding and decoding standards. In other words, a plurality of PUs may belong to a CU, or the PU and the CU have a same size. In this specification, when the PU and the CU have a same size, a partition mode of the CU is non-partition, or the CU is partitioned into one PU, and a PU and a CU is uniformly represented by a PU. When the video encoder performs inter-frame prediction, the video encoder may signal motion information used for the PU to the video decoder. For example, the motion information of the PU may include: a reference picture index, a motion vector, and a prediction direction identifier. The motion vector may indicate displacement between a picture block (also referred to as a video block, a pixel block, a pixel set, or the like) of the PU and a reference block of the PU. The reference block of the PU may be similar to a reference picture of the picture block of the PU. The reference block may be located in a reference picture indicated by the reference picture index and the prediction direction identifier.

To reduce a quantity of coded bits needed for representing the motion information of the PU, the video encoder may generate a candidate predictive motion vector (MV) list for each of the PUs according to processes of a merge prediction mode or an advanced motion vector prediction mode. Each candidate predictive motion vector in the candidate predictive motion vector list used for the PU may indicate motion information. Motion information indicated by some candidate predictive motion vectors in the candidate predictive motion vector list may be based on motion information of another PU. If a candidate predictive motion vector indicates motion information that specifies either of a spatial candidate predictive motion vector position and a temporal candidate predictive motion vector position, the candidate predictive motion vector may be referred to as an "original" candidate predictive motion vector in this application. For example, in the merge mode, also referred to as the merge prediction mode in this specification, there may be five original spatial candidate predictive motion vector positions and one original temporal candidate predictive motion vector position. In some examples, the video encoder may generate an additional candidate predictive motion vector by combining some motion vectors from different original candidate predictive motion vectors, modifying an original candidate predictive motion vector, or inserting only a zero motion vector as a candidate predictive motion vector. These additional candidate predictive motion vectors are not considered as original candidate predictive motion vectors and may be referred to as artificially generated candidate predictive motion vectors in this application.

The technologies of this application generally include a technology for generating a candidate predictive motion vector list on the video encoder and a technology for generating the same candidate predictive motion vector list on the video decoder. The video encoder and the video decoder may generate the same candidate predictive motion vector lists by implementing the same technology for constructing a candidate predictive motion vector list. For example, the video encoder and the video decoder may construct lists including a same quantity of candidate predictive motion vectors (for example, five candidate predictive motion vectors). The video encoder and the video decoder may first consider a spatial candidate predictive motion vector (for example, a neighboring block in a same picture) and then consider a temporal candidate predictive motion vector (for example, candidate predictive motion vectors in different pictures), and finally, may consider an artificially generated candidate predictive motion vector, until a desired quantity of candidate predictive motion vectors are added to the lists. According to the technologies of this application, during construction of candidate predictive motion vector lists, a pruning operation may be performed on some types of candidate predictive motion vectors, to remove repetitions from the candidate predictive motion vector lists, while for other types of candidate predictive motion vectors, pruning may not be performed, to reduce decoder complexity. For example, for a set of spatial candidate predictive motion vectors and for a temporal candidate predictive motion vector, a pruning operation may be performed to exclude a candidate predictive motion vector having repeated motion information from the candidate predictive motion vector lists. However, when an artificially generated candidate predictive motion vector is to be added to the candidate predictive motion vector lists, the artificially generated candidate predictive motion vector may be added when the pruning operation is not performed on the artificially generated candidate predictive motion vector.

After generating the candidate predictive motion vector list used for the PU in the CU, the video encoder may select a candidate predictive motion vector from the candidate predictive motion vector list and output a candidate predictive motion vector index in a bitstream. The selected candidate predictive motion vector may be a candidate predictive motion vector having a motion vector producing a predictor that most closely matches a target PU that is being decoded. The candidate predictive motion vector index may indicate a position of the selected candidate predictive motion vector in the candidate predictive motion vector list. The video encoder may further generate, based on a reference block indicated by the motion information of the PU, a predictive picture block used for the PU. The motion information of the PU may be determined based on motion information indicated by the selected candidate predictive motion vector. For example, in the merge mode, the motion information of the PU may be the same as the motion information indicated by the selected candidate predictive motion vector. In an AMVP mode, the motion information of the PU may be determined based on a motion vector difference of the PU and the motion information indicated by the selected candidate predictive motion vector. The video encoder may generate, based on the predictive picture block of the PU in the CU and an original picture block used for the CU, one or more residual picture blocks used for the CU. The video encoder may then code the one or more residual picture blocks and output the one or more residual picture blocks in the bitstream.

The bitstream may include data for identifying the selected candidate predictive motion vector in the candidate predictive motion vector list of the PU. The video decoder may determine the motion information of the PU based on the motion information indicated by the selected candidate predictive motion vector in the candidate predictive motion vector list of the PU. The video decoder may identify, based on the motion information of the PU, one or more reference blocks used for the PU. After identifying the one or more reference blocks of the PU, the video decoder may generate, based on the one or more reference blocks of the PU, the predictive picture block used for the PU. The video decoder may reconstruct, based on the predictive picture block of the PU in the CU and the one or more residual picture blocks used for the CU, a picture block used for the CU.

For ease of explanation, in this application, a position or a picture block may be described as having various spatial relationships with the CU or the PU. Such descriptions may be explained as follows: the position or the picture block has various spatial relationships with a picture block associated with the CU or the PU. In addition, in this application, a PU that is being decoded by the video decoder may be referred to as a current PU, or may be referred to as a current to-be-processed picture block. A CU that is being decoded by the video decoder may be referred to as a current CU in this application. A picture that is being decoded by the video decoder may be referred to as a current picture in this application. It should be understood that this application is also applicable to a case in which a PU and a CU have a same size, or a PU is a CU, and a PU and a CU is uniformly represented by a PU.

As described briefly above, the video encoder 20 may generate a predictive picture block and motion information for a PU in a CU through inter-frame prediction. In many examples, motion information of a given PU may be the same or similar to motion information of one or more nearby PUs (for example, PUs whose picture blocks are spatially or temporally near a picture block of the given PU). Because the nearby PU often has similar motion information, the video encoder 20 may code the motion information of the given PU with reference to the motion information of the nearby PU. Coding the motion information of the given PU with reference to the motion information of the nearby PU may reduce a quantity of coded bits needed in a bitstream for indicating the motion information of the given PU.

The video encoder 20 may code the motion information of the given PU with reference to the motion information of the nearby PU in various manners. For example, the video encoder 20 may indicate that the motion information of the given PU is the same as the motion information of the nearby PU. In this application, the merge mode may be used to indicate that the motion information of the given PU is the same as or may be deduced from the motion information of the nearby PU. In another feasible implementation, the video encoder 20 may calculate a motion vector difference (MVD) used for the given PU. The MVD indicates a difference between a motion vector of the given PU and a motion vector of the nearby PU. The video encoder 20 may include the MVD instead of the motion vector of the given PU in the motion information of the given PU. In the bitstream, a quantity of coded bits used for representing the MVD is smaller than a quantity of coded bits needed for representing the motion vector of the given PU. In this application, the advanced motion vector prediction mode may be used to indicate that the motion information of the given PU is signaled to a decoder side by using the MVD and an index value for identifying a candidate motion vector.

To signal the motion information of the given PU to the decoder side in the merge mode or the AMVP mode, the video encoder 20 may generate a candidate predictive motion vector list used for the given PU. The candidate predictive motion vector list may include one or more candidate predictive motion vectors. Each candidate predictive motion vector in the candidate predictive motion vector list used for the given PU may specify motion information. The motion information indicated by each candidate predictive motion vector may include a motion vector, a reference picture index, and a prediction direction identifier. The candidate predictive motion vector in the candidate predictive motion vector list may include an "original" candidate predictive motion vector, and each indicates motion information of one of specified candidate predictive motion vector positions within a PU different from the given PU.

After generating the candidate predictive motion vector list used for the PU, the video encoder 20 may select a candidate predictive motion vector from the candidate predictive motion vector list used for the PU. For example, the video encoder may compare each candidate predictive motion vector with a PU that is being decoded and may select a candidate predictive motion vector with a desired rate-distortion cost. The video encoder 20 may output a candidate predictive motion vector index used for the PU. The candidate predictive motion vector index may indicate a position of the selected candidate predictive motion vector in the candidate predictive motion vector list.

In addition, the video encoder 20 may generate, based on a reference block indicated by the motion information of the PU, a predictive picture block used for the PU. The motion information of the PU may be determined based on motion information indicated by the selected candidate predictive motion vector in the candidate predictive motion vector list used for the PU. For example, in the merge mode, the motion information of the PU may be the same as the motion information indicated by the selected candidate predictive motion vector. In the AMVP mode, the motion information of the PU may be determined based on a motion vector difference used for the PU and the motion information indicated by the selected candidate predictive motion vector. The video encoder 20 may process the predictive picture block used for the PU as described above.

When the video decoder 30 receives the bitstream, the video decoder 30 may generate a candidate predictive motion vector list used for each of the PUs of the CU. A candidate predictive motion vector list generated by the video decoder 30 for the PU may be the same as the candidate predictive motion vector list generated by the video encoder 20 for the PU. A syntactic element obtained by parsing the bitstream may indicate a position of a selected candidate predictive motion vector in the candidate predictive motion vector list of the PU. After generating the candidate predictive motion vector list used for the PU, the video decoder 30 may generate, based on one or more reference blocks indicated by motion information of the PU, a predictive picture block used for the PU. The video decoder 30 may determine the motion information of the PU based on motion information indicated by the selected candidate predictive motion vector in the candidate predictive motion vector list used for the PU. The video decoder 30 may reconstruct, based on the predictive picture block used for the PU and the residual picture blocks used for the CU, a picture block used for the CU.

It should be understood that in a feasible implementation, on the decoder side, construction of the candidate predictive motion vector list and parsing the bitstream to obtain the position of the selected candidate predictive motion vector in the candidate predictive motion vector list are independent of each other, and may be performed in any order or simultaneously performed.

In another feasible implementation, on the decoder side, the position of the selected candidate predictive motion vector in the candidate predictive motion vector list is first obtained through parsing the bitstream, and the candidate predictive motion vector list is constructed based on the position obtained through parsing. In this implementation, not all candidates in the candidate predictive motion vector list need to be constructed, and only a candidate predictive motion vector list in the position obtained through parsing needs to be constructed, that is, a candidate predictive motion vector in the position can be determined. For example, when the selected candidate predictive motion vector obtained through parsing the bitstream is a candidate predictive motion vector with an index 3 in the candidate predictive motion vector list, only a candidate predictive motion vector list from an index 0 to the index 3 needs to be constructed, and then the candidate predictive motion vector with the index 3 can be determined. Technical effects of reducing complexity and improving decoding efficiency can be implemented.

Figure 2:
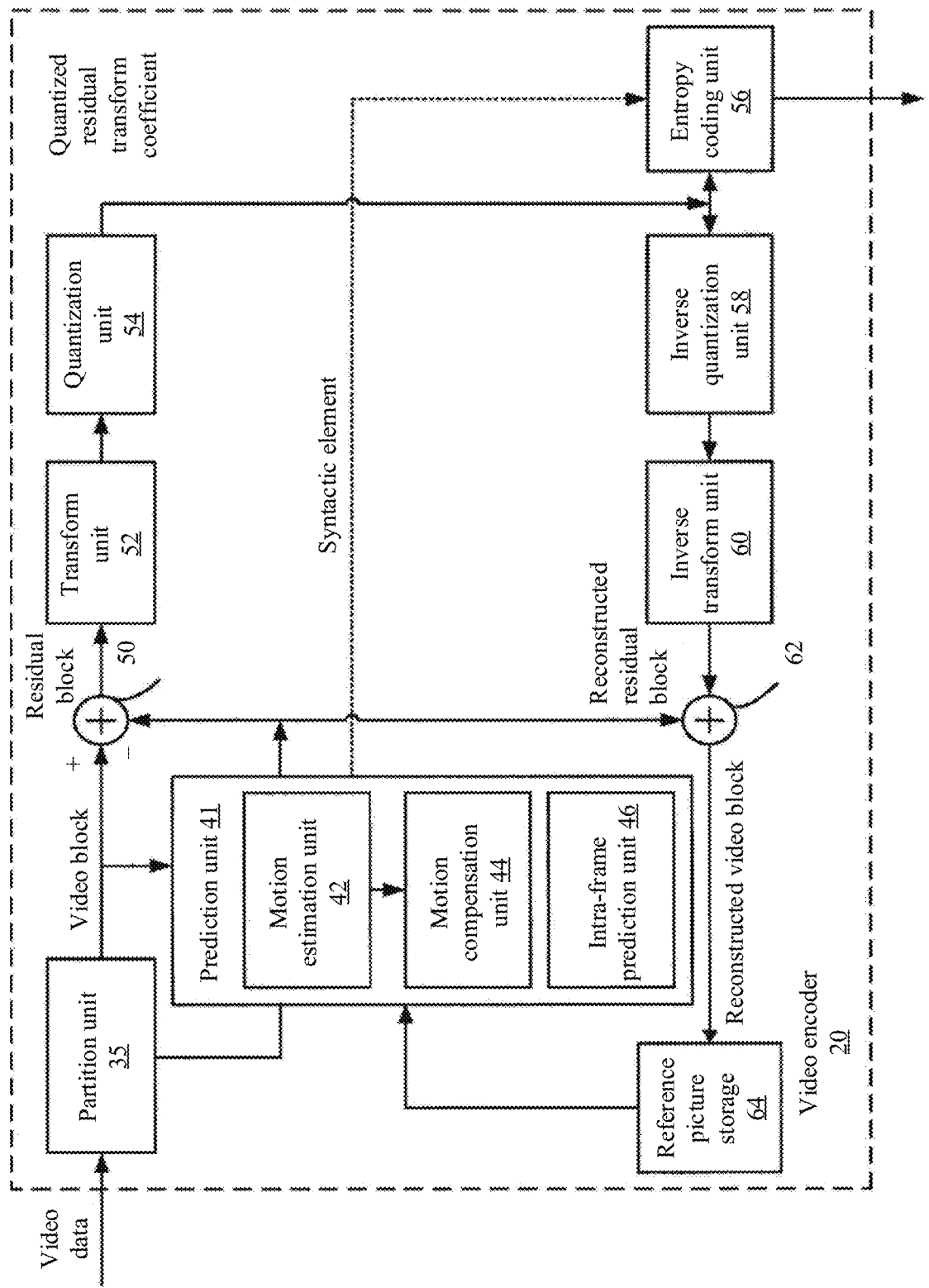
FIG. 2 is a schematic block diagram of a video encoder according to an embodiment of this application.

FIG. 2 is a schematic block diagram of a video encoder 20 according to an embodiment of this application. The video encoder 20 may perform intra-frame decoding and inter-frame decoding for a video block in a video slice. The intra-frame decoding relies on spatial prediction to reduce or remove spatial redundancy of a video in a given video frame or picture. The inter-frame decoding relies on time prediction to reduce or remove time redundancy of a video in a neighboring frame or picture of a video sequence. An intra-frame mode (I mode) may be any one of several space-based compression modes. An inter-frame mode, such as unidirectional prediction (P mode) or bidirectional prediction (B mode), may be any one of several time-based compression modes.

In a feasible implementation of FIG. 2, the video encoder 20 includes a partition unit 35, a prediction unit 41, a reference picture storage 64, a summator 50, a transform processing unit 52, a quantization unit 54, and an entropy coding unit 56. The prediction unit 41 includes a motion estimation unit 42, a motion compensation unit 44, and an intra-frame prediction unit 46. For video block reconstruction, the video encoder 20 further includes an inverse quantization unit 58, an inverse transform unit 60, and a summator 62. A de-blocking filter (not shown in FIG. 2) may be further included to perform filtering on a boundary of a block, to remove block artifact from a reconstructed video. When needed, the de-blocking filter usually performs filtering on an output of the summator 62. In addition to the de-blocking filter, an additional loop filter may also be used (within or after a loop).

As shown in FIG. 2, the video encoder 20 receives video data, and the partition unit 35 partitions the data into video blocks. Such partitioning may further include partitioning into slices, picture blocks, or other larger units, and (for example) video block partitioning according to quadtree structures of LCUs and CUs. For example, for the video encoder 20, components for coding video blocks in a to-be-coded video slice are described. Generally, one slice may be partitioned into a plurality of video blocks (and may be partitioned into sets of video blocks that are referred to as picture blocks).

The prediction unit 41 may select one of a plurality of possible decoding modes of a current video block, for example, one of a plurality of intra-frame decoding modes or one of a plurality of inter-frame decoding modes, based on a calculation result of coding quality and costs (for example, a rate-distortion cost, RD cost). The prediction unit 41 may provide an intra-frame decoded or inter-frame decoded block to the summator 50 to generate residual block data, and provide the intra-frame decoded or inter-frame decoded block to the summator 62 to reconstruct a coded block and use the reconstructed block as a reference picture.

The motion estimation unit 42 and the motion compensation unit 44 in the prediction unit 41 perform inter-frame predictive decoding for the current video block of one or more predictive blocks with respect to one or more reference pictures, for time compression. The motion estimation unit 42 may be configured to determine an inter-frame prediction mode for a video slice based on a predetermined mode of a video sequence. In the predetermined mode, a video slice in the sequence may be specified as a P slice, a B slice, or a GPB slice. The motion estimation unit 42 and the motion compensation unit 44 may be highly integrated, but are described separately for a concept explanation purpose. Motion estimation performed by the motion estimation unit 42 is a process of generating a motion vector for estimating a video block. For example, the motion vector may indicate a displacement of a PU of a video block in a current video frame or picture relative to a predictive block in a reference picture.

A predictive block is a block in a PU that is found, based on a pixel difference, closely matching a to-be-decoded video block, and the pixel difference may be determined based on a sum of absolute differences (SAD), a sum of squared differences (SSD), or other difference metrics. In some feasible implementations, the video encoder 20 may calculate a value of a sub-integer pixel position of a reference picture stored in the reference picture storage 64. For example, the video encoder 20 may interpolate a value of ¼ pixel position, ⅛ pixel position, or other fraction pixel positions of the reference picture. Therefore, the motion estimation unit 42 may perform a motion search with respect to a full pixel position and a fraction pixel position, and output a motion vector with a fraction pixel precision.

The motion estimation unit 42 calculates a motion vector of a PU of a video block in an inter-frame decoded slice by comparing a position of the PU and a position of the predictive block of the reference picture. The reference picture may be selected from a first reference picture list (a list 0) or a second reference picture list (a list 1). Each element in the list identifies one or more reference pictures stored in the reference picture storage 64. The motion estimation unit 42 sends the calculated motion vector to the entropy coding unit 56 and the motion compensation unit 44.

Motion compensation implemented by the motion compensation unit 44 may be abstracting or generating a predictive block based on the motion vector determined through motion estimation, and interpolation to a sub-pixel precision may be performed. After receiving the motion vector of the PU of the current video block, the motion compensation unit 44 may locate a predictive block directed by the motion vector in one of the reference picture lists. The video encoder 20 subtracts a pixel value of the predictive block from a pixel value of the current video block being decoded, to obtain a residual video block and generate a pixel difference. The pixel difference forms residual data of a block, and may include a luminance difference component and a chroma difference component. The summator 50 is one or more components performing the subtraction operation. The motion compensation unit 44 may further generate a syntactic element associated with the video block and the video slice for the video decoder 30 to decode the video block in the video slice.

If the PU is in a B slice, a picture including the PU may be associated with two reference picture lists referred to as a "list 0" and a "list 1". In some feasible implementations, a picture including the B slice may be associated with a list combining the list 0 and the list 1.

In addition, if the PU is in the B slice, the motion estimation unit 42 may perform unidirectional prediction or bidirectional prediction on the PU. In some feasible implementations, the bidirectional prediction is prediction performed based on pictures in the reference picture lists: the list 0 and the list 1. In some other feasible implementations, the bidirectional prediction is prediction performed based on a reconstructed future frame and a reconstructed previous frame of a current frame in a display order. When the motion estimation unit 42 performs unidirectional prediction on the PU, the motion estimation unit 42 may search reference pictures in the list 0 or the list 1 for a reference block used for the PU. Then, the motion estimation unit 42 may generate a reference index indicating a reference picture including a reference block in the list 0 or the list 1, and a motion vector indicating a spatial displacement between the PU and the reference block. The motion estimation unit 42 may output the reference index, a prediction direction identifier, and the motion vector as motion information of the PU. The prediction direction identifier may indicate the reference picture indicated by the reference index in the list 0 or the list 1. The motion compensation unit 44 may generate a predictive picture block of the PU based on the reference block indicated by the motion information of the PU.

When the motion estimation unit 42 performs bidirectional prediction on the PU, the motion estimation unit 42 may search the reference pictures in the list 0 for a reference block used for the PU, and may further search the reference pictures in the list 1 for another reference block for the PU. Then, the motion estimation unit 42 may generate a reference index of a reference picture including the reference block in the list 0 or the list 1, and a motion vector indicating a spatial displacement between the reference block and the PU. The motion estimation unit 42 may output the reference index and the motion vector of the PU as motion information of the PU. The motion compensation unit 44 may generate a predictive picture block of the PU based on the reference block indicated by the motion information of the PU.

In some feasible implementations, the motion estimation unit 42 does not output a complete set of the motion information used for the PU to the entropy coding unit 56. Instead, the motion estimation unit 42 may signal the motion information of the PU with reference to motion information of another PU. For example, the motion estimation unit 42 may determine that the motion information of the PU is fully similar to motion information of a neighboring PU. In this implementation, the motion estimation unit 42 may indicate an indicator value in a syntactic structure associated with the PU, and the indicator value indicates, to the video decoder 30, that the PU has motion information the same as the neighboring PU or has motion information that may be derived from the neighboring PU. In another implementation, the motion estimation unit 42 may identify, from the syntactic structure associated with the PU, a candidate predictive motion vector associated with the neighboring PU and a motion vector difference (MVD). The MVD indicates a difference between the motion vector of the PU and the indicated candidate predictive motion vector associated with the neighboring PU. The video decoder 30 may determine the motion vector of the PU by using the indicated candidate predictive motion vector and the MVD.

As described above, the prediction module 41 may generate a candidate predictive motion vector list for each PU in the CU. One or more candidate predictive motion vector lists may include one or more original candidate predictive motion vectors and one or more additional candidate predictive motion vectors deduced from the original candidate predictive motion vectors.

The intra-frame prediction unit 46 in the prediction unit 41 may perform intra-frame predictive decoding for a current video block relative to one or more neighboring blocks in the same picture or slice as the current to-be-decoded block for spatial compression. Therefore, as an alternative of inter-frame prediction (as described earlier) performed by the motion estimation unit 42 and the motion compensation unit 44, the intra-frame prediction unit 46 may perform intra-frame prediction for the current block. Specifically, the intra-frame prediction unit 46 may determine an intra-frame prediction mode for coding the current block. In some feasible implementations, the intra-frame prediction unit 46 may (for example) code the current block by using various intra-frame prediction modes during coding traversal, and the intra-frame prediction unit 46 (or in some feasible implementations, a mode selection unit 40) may select, from tested modes, an appropriate intra-frame prediction mode for use.

After the prediction unit 41 generates a predictive block of the current video block through inter-frame prediction or intra-frame prediction, the video encoder 20 subtracts the predictive block from the current video block, to generate a residual video block. Residual video data in the residual block may be included in one or more TUs, and is applied to the transform processing unit 52. The transform processing unit 52 applies transform, for example, DCT or other conceptually similar transform (for example, discrete sine transform, DST) to transform the residual video data into a residual transform coefficient. The transform processing unit 52 may convert the residual video data from a pixel domain to a transform domain (for example, a frequency domain).

The transform processing unit 52 may send an obtained transform coefficient to the quantization unit 54. The quantization unit 54 quantizes the transform coefficient to further reduce a bitrate. The quantization process can reduce a bit depth associated with some or all of the coefficients. A quantization degree may be modified by adjusting a quantization parameter. In some feasible implementations, the quantization unit 54 may then perform scanning for a matrix including the quantized transform coefficient. Alternatively, the entropy coding unit 56 may perform the scanning.

After quantization, the entropy coding unit 56 may entropy-code the quantized transform coefficient. For example, the entropy coding unit 56 may perform CAVLC, CABAC, SBAC, PIPE, or another entropy coding method or technology. The entropy coding unit 56 may also entropy-code a motion vector and another syntactic element of a currently decoded video slice. After being entropy-coded by the entropy coding unit 56, a coded bitstream may be transmitted to the video decoder 30 or recorded for subsequent transmission or retrieval by the video decoder 30.

The entropy coding unit 56 may code information indicating, according to the technologies of this application, the selected intra-frame prediction mode. The video encoder 20 may include, in transmitted bitstream configuration data that may include a plurality of intra-frame prediction mode index tables and a plurality of modified intra-frame prediction mode index tables (or referred to as codeword mapping tables), definitions of coding contexts of various blocks, and an indicator of an MPM, an intra-frame prediction mode index table, and a modified intra-frame prediction mode index table for each of the contexts.

The inverse quantization unit 58 and the inverse transform unit 60 respectively apply inverse quantization and inverse transform, to reconstruct a residual block in the pixel domain to be subsequently used as a reference block of a reference picture. The motion compensation unit 44 may calculate the reference block by summing the residual block and a predictive block of one of the reference pictures in one of the reference picture lists. The motion compensation unit 44 may alternatively apply one or more interpolation filters to the reconstructed residual block, to calculate a sub-integer pixel value for motion estimation. The summator 62 adds the reconstructed residual block and the motion compensated predictive block generated by the motion compensation unit 44 to generate the reference block, and the reference block is stored in the reference picture storage 64. The reference block may be used by the motion estimation unit 42 and the motion compensation unit 44 as a reference block for performing inter-frame prediction for a block in a subsequent video frame or picture.

Figure 3:
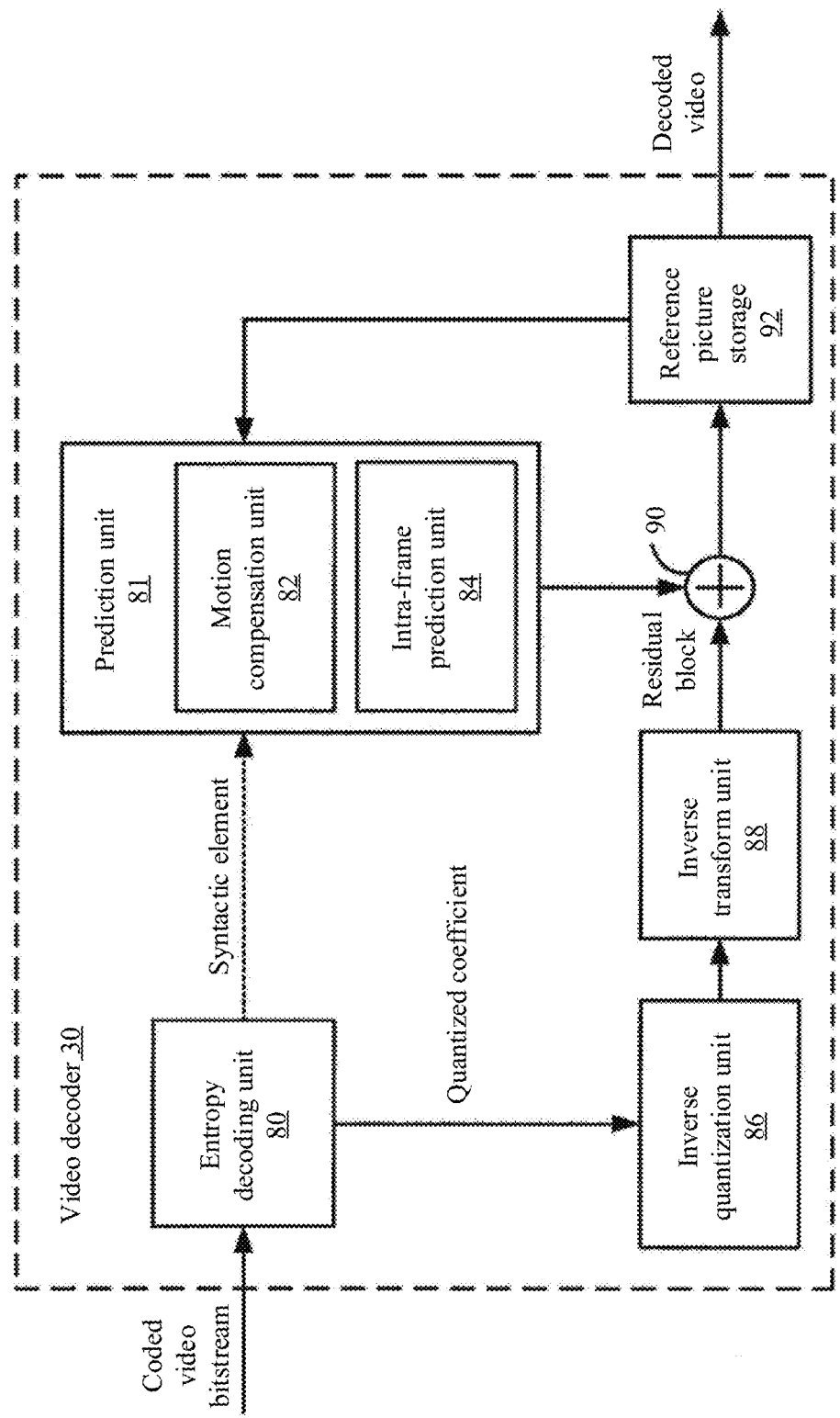
FIG. 3 is a schematic block diagram of a video decoder according to an embodiment of this application.

FIG. 3 is a schematic block diagram of a video decoder 30 according to an embodiment of this application. In a feasible implementation of FIG. 3, the video decoder 30 includes an entropy coding unit 80, a prediction unit 81, an inverse quantization unit 86, an inverse transform unit 88, a summator 90, and a reference picture storage 92. The prediction unit 81 includes a motion compensation unit 82 and an intra-frame prediction unit 84. In some feasible implementations, the video decoder 30 may perform a decoding process inverse to the coding process of the video encoder 20 described in FIG. 4.

During decoding, the video decoder 30 receives, from the video encoder 20, a coded video bitstream representing a video block of a coded video slice and an associated syntactic element. The entropy coding unit 80 of the video decoder 30 entropy decodes the bitstream, to generate a quantized coefficient, a motion vector, and other syntactic elements. The entropy coding unit 80 sends the motion vector and other syntactic elements to the prediction unit 81. The video decoder 30 may receive the syntactic elements at a video slice level and/or a video block level.

When a video slice is decoded as an intra-frame decoded (I) slice, the intra-frame prediction unit 84 of the prediction unit 81 may generate prediction data of a video block in the current video slice based on a signaled intra-frame prediction mode and data of a previously decoded block of a current frame or picture.

When a video picture is decoded as an inter-frame decoded slice (for example, a B slice, a P slice, or a GPB slice), the motion compensation unit 82 of the prediction unit 81 generates a predictive block of a video block of the current video picture based on the motion vector and other syntactic elements that are received from the entropy coding unit 80. The predictive block may be generated from one of reference pictures in one of reference picture lists. The video decoder 30 may use a default reconstruction technology to construct reference picture lists (a list 0 and a list 1) based on a reference picture stored in the reference picture storage 92.

The motion compensation unit 82 determines prediction information of a video block of the current video slice by parsing the motion vector and the other syntactic elements, and uses the prediction information to generate the predictive block of the currently decoded video block. For example, the motion compensation unit 82 uses some of the received syntactic elements to determine a prediction mode (for example, intra-frame prediction or inter-frame prediction) for decoding the video block of the video slice, an inter-frame prediction slice type (for example, a B slice, a P slice, or a GPB slice), construction information of one or more of the reference picture lists for the slice, a motion vector for each inter-frame coded video block of the slice, an inter-frame prediction status for each inter-frame decoded video block of the slice, and other information for decoding the video block in the current video slice.

The motion compensation unit 82 may further perform interpolation by using an interpolation filter. The motion compensation unit 82 may use an interpolation filter used by the video encoder 20 during video block coding, to calculate an interpolation value of a sub-integer pixel of a reference block. In this case, the motion compensation unit 82 may determine, based on the received syntactic elements, the interpolation filter used by the video encoder 20, and use the interpolation filter to generate the predictive block.

If a PU is coded through inter-frame prediction, the motion compensation unit 82 may generate a candidate predictive motion vector list used for the PU. A bitstream may include data for identifying a position of a selected candidate predictive motion vector in the candidate predictive motion vector list of the PU. After generating the candidate predictive motion vector list used for the PU, the motion compensation unit 82 may generate, based on one or more reference blocks indicated by motion information of the PU, a predictive picture block used for the PU. The reference block of the PU may be in a time picture different from the PU. The motion compensation unit 82 may determine the motion information of the PU based on motion information selected from the candidate predictive motion vector list of the PU.

The inverse quantization unit 86 performs inverse quantization (for example, dequantization) on a quantized transform coefficient provided in the bitstream and decoded by the entropy coding unit 80. The inverse quantization process may include determining a quantization degree based on a quantization parameter calculated by the video encoder 20 for each video block in the video slice, and determining an inverse quantization degree to be applied. The inverse transform unit 88 applies inverse transform (for example, inverse DCT, inverse integer transform, or a conceptually similar inverse transform process) to the transform coefficient to generate a residual block in pixel domain.

After the motion compensation unit 82 generates the predictive block of the current video block based on the motion vector and the other syntactic elements, the video decoder 30 summates the residual block from the inverse transform unit 88 and the corresponding predictive block generated by the motion compensation unit 82, to generate a decoded video block. The summator 90 is one or more components performing the summation operation. When needed, a de-blocking filter may be used to filter the decoded block to remove block artifact. Another loop filter (in a decoding loop or after a decoding loop) may also be used to smooth pixel transform, or video quality is improved in another manner. Then, a decoded video block in a given frame or picture is stored into the reference picture storage 92. The reference picture storage 92 stores a reference picture used for subsequent motion compensation. The reference picture storage 92 also stores the decoded video to be later presented on a display apparatus such as the display apparatus 32 in FIG. 1.

As described above, the technologies of this application relates to, for example, inter-frame decoding. It should be understood that the technologies of this application may be implemented by any video decoder described in this application, and the video decoder includes (for example) the video encoder 20 and the video decoder 30 shown and described in FIG. 1 to FIG. 3. To be specific, in a feasible implementation, the prediction unit 41 described in FIG. 2 may perform a particular technology described below when inter-frame prediction is performed during coding on a block of video data. In another feasible implementation, the prediction unit 81 described in FIG. 3 may perform a particular technology described below when inter-frame prediction is performed during decoding on a block of video data. Therefore, a reference to a general "video encoder" or "video decoder" may include the video encoder 20, the video decoder 30, or another video coding or decoding unit.

Figure 4:
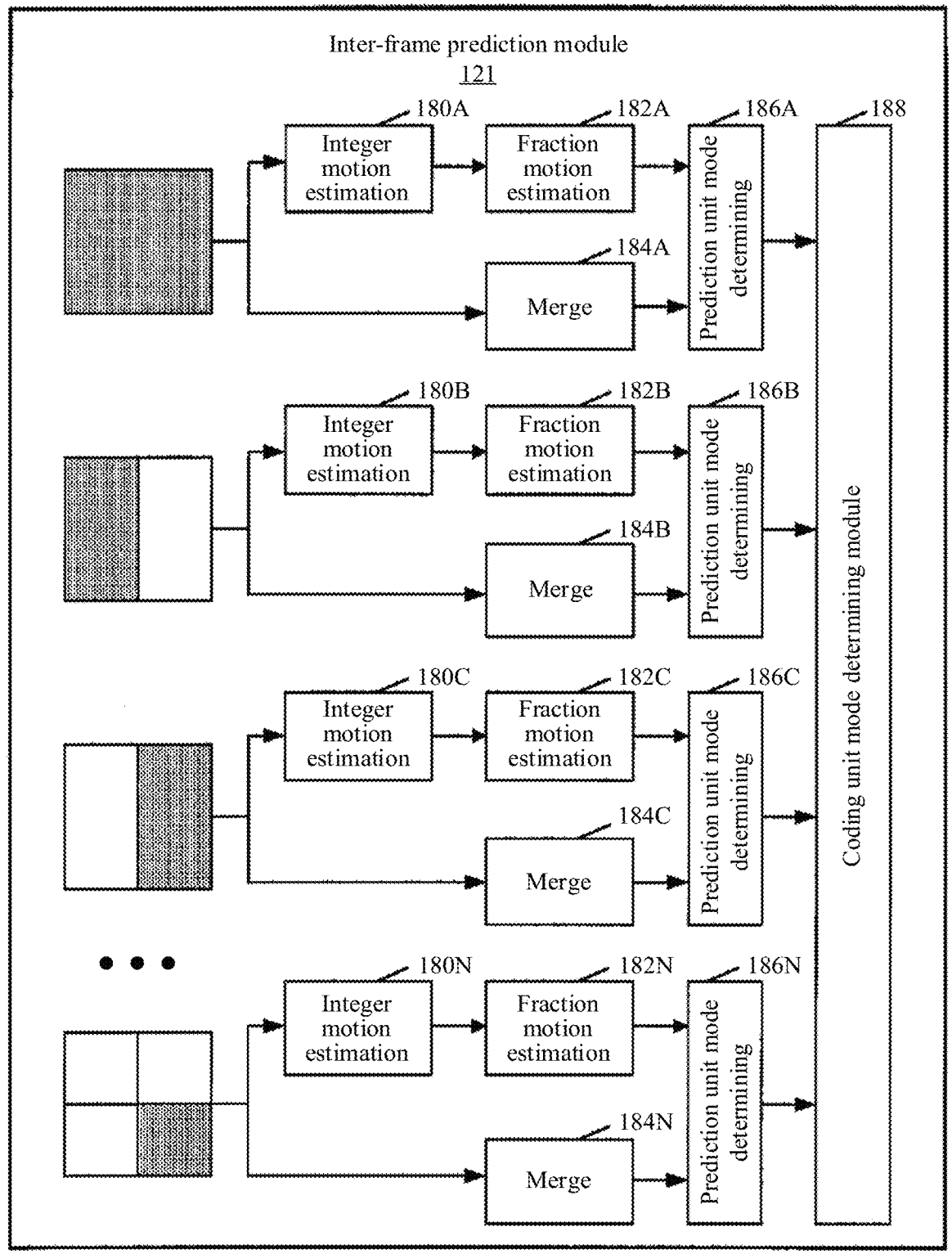
FIG. 4 is a schematic block diagram of an inter-frame prediction module according to an embodiment of this application.

FIG. 4 is a schematic block diagram of an inter-frame prediction module according to an embodiment of this application. An inter-frame prediction module 121, for example, may include a motion estimation unit 42 and a motion compensation unit 44. A relationship between a PU and a CU is different in different video compression coding and decoding standards. The inter-frame prediction module 121 may partition a current CU into PUs in a plurality of partition modes. For example, the inter-frame prediction module 121 may partition the current CU into PUs in partition modes of 2N×2N, 2N×N, N×2N, and N×N. In another embodiment, the current CU is a current PU, and this is not limited.

The inter-frame prediction module 121 may perform integer motion estimation (IME) and then perform fraction motion estimation (FME) on each of the PUs. When the inter-frame prediction module 121 performs IME on the PU, the inter-frame prediction module 121 may search one or more reference pictures for a reference block used for the PU. After finding the reference block used for the PU, the inter-frame prediction module 121 may generate a motion vector that indicates, with integer precision, spatial displacement between the PU and the reference block used for the PU. When the inter-frame prediction module 121 performs FME on the PU, the inter-frame prediction module 121 may improve a motion vector generated by performing IME on the PU. The motion vector generated by performing FME on the PU may have sub-integer precision (for example, ½ pixel precision or ¼ pixel precision). After generating the motion vector used for the PU, the inter-frame prediction module 121 may generate, by using the motion vector used for the PU, a predictive picture block used for the PU.

In some feasible implementations in which the inter-frame prediction module 121 signals the motion information of the PU to a decoder side in an AMVP mode, the inter-frame prediction module 121 may generate a candidate predictive motion vector list used for the PU. The candidate predictive motion vector list may include one or more original candidate predictive motion vectors and one or more additional candidate predictive motion vectors deduced from the original candidate predictive motion vectors. After generating the candidate predictive motion vector list used for the PU, the inter-frame prediction module 121 may select a candidate predictive motion vector from the candidate predictive motion vector list and generate a MVD used for the PU. The MVD used for the PU may indicate a difference between a motion vector indicated by the selected candidate predictive motion vector and the motion vector generated for the PU by IME and FME. In these feasible implementations, the inter-frame prediction module 121 may output a candidate predictive motion vector index identifying a position of the selected candidate predictive motion vector in the candidate predictive motion vector list. The inter-frame prediction module 121 may further output the MVD of the PU. The following describes in detail a feasible implementation of the advanced motion vector prediction mode in this embodiment of this application in FIG. 6.

In addition to performing IME and FME on the PU to generate the motion information used for the PU, the inter-frame prediction module 121 may further perform a merge operation on each of the PUs. When the inter-frame prediction module 121 performs the merge operation on the PU, the inter-frame prediction module 121 may generate a candidate predictive motion vector list used for the PU. The candidate predictive motion vector list used for the PU may include one or more original candidate predictive motion vectors and one or more additional candidate predictive motion vectors deduced from the original candidate predictive motion vectors. The original candidate predictive motion vectors in the candidate predictive motion vector list may include one or more spatial candidate predictive motion vectors and a temporal candidate predictive motion vector. The spatial candidate predictive motion vector may indicate motion information of another PU in a current picture. The temporal candidate predictive motion vector may be based on motion information of a corresponding PU in a picture different from the current picture. The temporal candidate predictive motion vector may alternatively be referred to as temporal motion vector prediction (TMVP).

Figure 5:
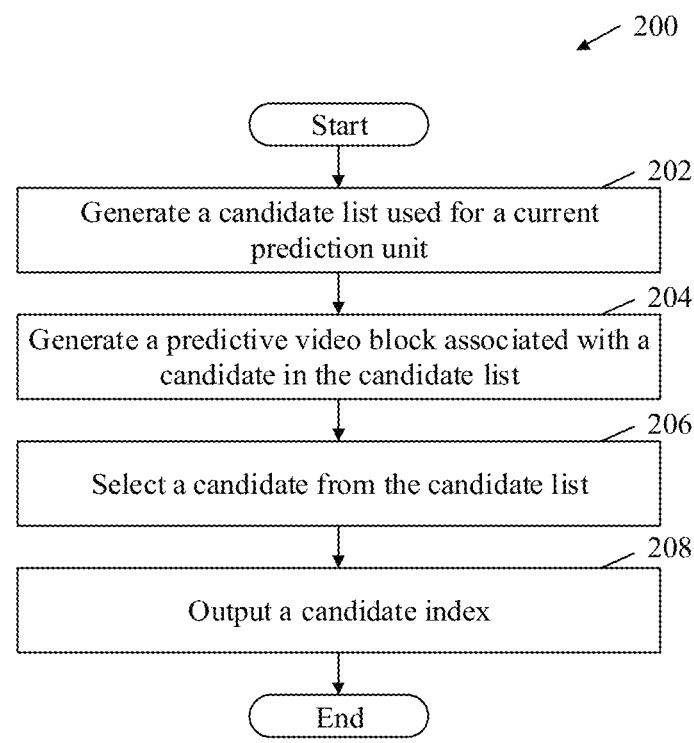
FIG. 5 is an example flowchart of a merge prediction mode according to an embodiment of this application.

After generating the candidate predictive motion vector list, the inter-frame prediction module 121 may select a candidate predictive motion vector from the candidate predictive motion vector list. In addition, the inter-frame prediction module 121 may generate, based on the reference block indicated by the motion information of the PU, a predictive picture block used for the PU. In the merge mode, the motion information of the PU may be the same as motion information indicated by the selected candidate predictive motion vector. FIG. 5 described below illustrates an example flowchart of the merge mode.

After generating, by IME and FME, the predictive picture block used for the PU and generating, by the merge operation, the predictive picture block used for the PU, the inter-frame prediction module 121 may select the predictive picture block generated by the FME operation or the predictive picture block generated by the merge operation. In some feasible implementations, the inter-frame prediction module 121 may select, based on a rate-distortion cost analysis of the predictive picture block generated by the FME operation and the predictive picture block generated by the merge operation, a predictive picture block used for the PU.

After the inter-frame prediction module 121 selects a predictive picture block of a PU generated by partitioning the current CU according to each of partition modes (in some implementations, after a coding tree unit CTU is partitioned into CUs, the CU is not further partitioned into smaller PUs, and in this case, the PU is equivalent to the CU), the inter-frame prediction module 121 may select a partition mode used for the current CU. In some implementations, the inter-frame prediction module 121 may select, based on a rate-distortion cost analysis for a selected predictive picture block of a PU generated by partitioning the current CU according to each of the partition modes, a partition mode used for the current CU. The inter-frame prediction module 121 may output, to a residual generation module 102, a predictive picture block associated with a PU that belongs to the selected partition mode. The inter-frame prediction module 121 may output, to an entropy coding unit 56, a syntactic element of motion information of the PU that belongs to the selected partition mode.

In the schematic diagram of FIG. 4, the inter-frame prediction module 121 includes IME modules 180A to 180N (collectively referred to as "IME modules 180"), FME modules 182A to 182N (collectively referred to as "FME modules 182"), merge modules 184A to 184N (collectively referred to as "merge modules 184"), PU mode determining modules 186A to 186N (collectively referred to as "PU mode determining modules 186"), and a CU mode determining module 188 (or may perform a mode determining process of dividing a CTU into CUs).

The IME modules 180, the FME modules 182, and the merge modules 184 may perform an IME operation, an FME operation, and a merge operation on the PU in the current CU. It is described in the schematic diagram of FIG. 4 that the inter-frame prediction module 121 includes a separate IME module 180, a separate FME module 182, and a separate merge module 184 for each PU in each partition mode of the CU. In another feasible implementation, the inter-frame prediction module 121 does not include a separate IME module 180, a separate FME module 182, and a separate merge module 184 for each PU in each partition mode of the CU.

As illustrated in the schematic diagram of FIG. 4, the IME module 180A, the FME module 182A, and the merge module 184A may perform an IME operation, an FME operation, and a merge operation on a PU generated by partitioning a CU in a 2N×2N partition mode. The PU mode determining module 186A may select one of predictive picture blocks generated by the IME module 180A, the FME module 182A, and the merge module 184A.

The IME module 180B, the FME module 182B, and the merge module 184B may perform an IME operation, an FME operation, and a merge operation on a left PU generated by partitioning a CU in an N×2N partition mode. The PU mode determining module 186B may select one of predictive picture blocks generated by the IME module 180B, the FME module 182B, and the merge module 184B.

The IME module 180C, the FME module 182C, and the merge module 184C may perform an IME operation, an FME operation, and a merge operation on a right PU generated by partitioning a CU in an N×2N partition mode. The PU mode determining module 186C may select one of predictive picture blocks generated by the IME module 180C, the FME module 182C, and the merge module 184C.

The IME module 180N, the FME module 182N, and the merge module 184N may perform an IME operation, an FME operation, and a merge operation on a lower right PU generated by partitioning a CU in an N×N partition mode. The PU mode determining module 186N may select one of predictive picture blocks generated by the IME module 180N, the FME module 182N, and the merge module 184N.

The PU mode determining module 186 may select a predictive picture block based on a rate-distortion cost analysis for a plurality of possible predictive picture blocks and select a predictive picture block that provides an optimum rate-distortion cost in a given decoding scenario. For example, for an application limited by bandwidth, the PU mode determining module 186 may prefer a predictive picture block for which a compression ratio is increased, and for another application, the PU mode determining module 186 may prefer a predictive picture block for which quality of reconstructed video is increased. After the PU mode determining modules 186 select predictive picture blocks for the PUs in the current CU, the CU mode determining module 188 selects a partition mode for the current CU and outputs a predictive picture block and motion information of a PU that belongs to the selected partition mode.

FIG. 5 is an example flowchart of a merge mode according to an embodiment of this application. A video encoder (for example, the video encoder 20) may perform a merge operation 200. In another feasible implementation, the video encoder may perform a merge operation different from the merge operation 200. For example, in another feasible implementation, the video encoder may perform a merge operation, and the video encoder performs steps more or less than steps in the merge operation 200 or steps different from the steps in the merge operation 200. In another feasible implementation, the video encoder may perform the steps of the merge operation 200 in different orders or in parallel. The encoder may also perform the merge operation 200 on a PU coded in a skip mode.

After the video encoder starts the merge operation 200, the video encoder may generate a candidate predictive motion vector list used for a current PU (202). The video encoder may generate, in various manners, the candidate predictive motion vector list used for the current PU. For example, the video encoder may generate, according to one of case technologies described below in FIG. 8 to FIG. 12, the candidate predictive motion vector list used for the current PU.

As described above, the candidate predictive motion vector list used for the current PU may include a temporal candidate predictive motion vector. The temporal candidate predictive motion vector may indicate motion information of a co-located PU in time domain. The co-located PU may be spatially located at a same position as the current PU in a picture frame, and is in a reference picture instead of a current picture. In this application, a reference picture that includes a co-located PU in time domain may be referred to as a related reference picture. In this application, a reference picture index of the related reference picture may be referred to as a related reference picture index. As described above, the current picture may be associated with one or more reference picture lists (for example, a list 0 and a list 1). The reference picture index may indicate the reference picture by indicating a position of the reference picture in a reference picture list. In some feasible implementations, the current picture may be associated with a combined reference picture list.

In some video encoders, the related reference picture index is a reference picture index that covers a PU in a reference index source position associated with the current PU. In these video encoders, the reference index source position associated with the current PU is contiguous to the left of the current PU or the top of the current PU. In this application, if a picture block associated with a PU includes a specific position, the PU may "cover" the specific position. In these video encoders, the video encoders may use a reference picture index 0 if the reference index source position is not available.

However, there may be the following example: The reference index source position associated with the current PU is within a current CU. In the example, if a PU is located on the top or left in the current CU, a PU covering the reference index source position associated with the current PU may be considered available. However, the video encoder may need to access motion information of another PU in the current CU to determine a reference picture including a co-located PU. Therefore, these video encoders may use motion information (namely, reference picture indexes) of PUs belonging to the current CU to generate a temporal candidate predictive motion vector used for the current PU. In other words, these video encoders may use the motion information of the PUs belonging to the current CU to generate the temporal candidate predictive motion vector. Therefore, the video encoder may not be able to generate, in parallel, candidate predictive motion vector lists used for the current PU and the PU in the reference index source position associated with the current PU.

According to the technologies of this application, the video encoder may explicitly set the related reference picture index without referring to a reference picture index of any other PU. In this way, the video encoder can generate, in parallel, candidate predictive motion vector lists used for the current PU and another PU in the current CU. The video encoder explicitly sets the related reference picture index, and therefore, the related reference picture index is not based on motion information of any other PU in the current CU. In some feasible implementations in which the video encoder explicitly sets the related reference picture index, the video encoder may always set the related reference picture index to a fixed preset reference picture index (for example, 0). In this manner, the video encoder may generate a temporal candidate predictive motion vector based on motion information of a co-located PU in a reference frame indicated by the preset reference picture index, and may add the temporal candidate predictive motion vector to a candidate predictive motion vector list of the current CU.

In a feasible implementation in which the video encoder explicitly sets the related reference picture index, the video encoder may explicitly signal the related reference picture index in a syntactic structure (for example, a picture header, a slice header, an APS, or another syntactic structure). In this feasible implementation, the video encoder may signal, to a decoder side, a related reference picture index of each LCU (namely, CTU), a CU, a PU, a TU, or another type of sub-block. For example, the video encoder may signal that a related reference picture index used for each PU in a CU is equal to "1".

In some feasible implementations, the related reference picture index may be set implicitly but not explicitly. In these feasible implementations, the video encoder may generate, by using motion information of PUs in reference pictures indicated by reference picture indexes of PUs covering positions outside the current CU, each temporal candidate predictive motion vector in candidate predictive motion vector lists used for the PUs in the current CU, even if these positions are not strictly contiguous to the current PU.

After generating the candidate predictive motion vector list used for the current PU, the video encoder may generate predictive picture blocks associated with candidate predictive motion vectors in the candidate predictive motion vector list (204). The video encoder may determine motion information of the current PU based on motion information of the indicated candidate predictive motion vector and then generate predictive picture blocks based on one or more reference blocks indicated by the motion information of the current PU, to generate the predictive picture blocks associated with the candidate predictive motion vectors. The video encoder may then select a candidate predictive motion vector from the candidate predictive motion vector list (206). The video encoder may select the candidate predictive motion vector in various manners. For example, the video encoder may then select a candidate predictive motion vector based on a rate-distortion cost analysis of each of the predictive picture blocks associated with the candidate predictive motion vectors.

After selecting the candidate predictive motion vector, the video encoder may output a candidate predictive motion vector index (208). The candidate predictive motion vector index may indicate a position of the selected candidate predictive motion vector in the candidate predictive motion vector list. In some feasible implementations, the candidate predictive motion vector index may be represented as "merge_idx".

Figure 6:
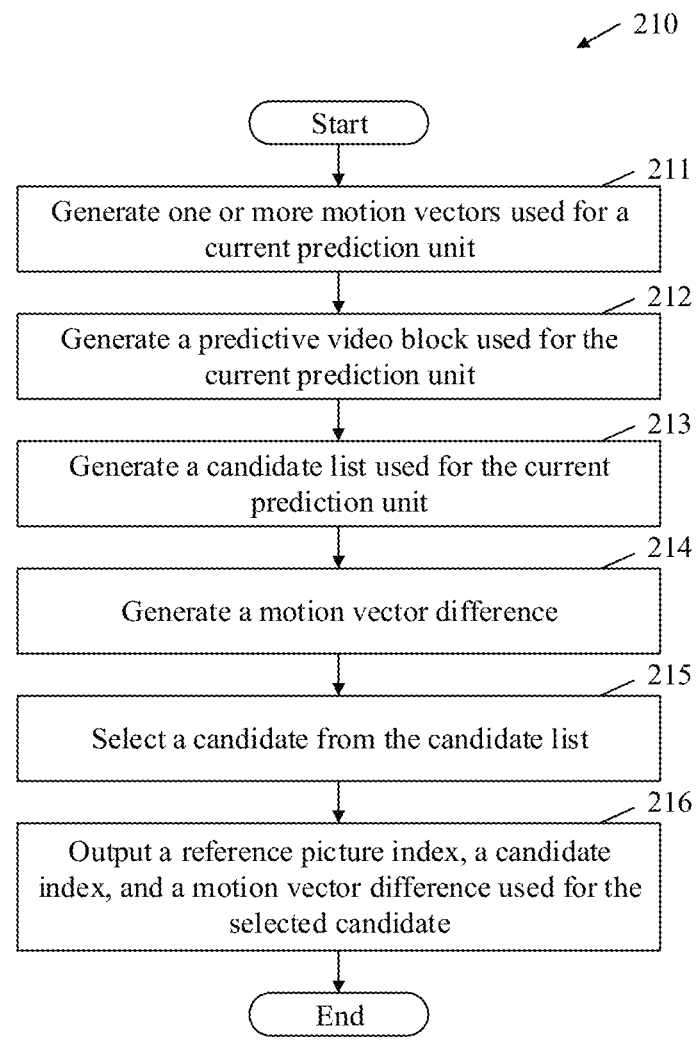
FIG. 6 is an example flowchart of an advanced motion vector prediction mode according to an embodiment of this application.

FIG. 6 is an example flowchart of an AMVP mode according to an embodiment of this application. A video encoder (for example, the video encoder 20) may perform an AMVP operation 210.

After the video encoder starts the AMVP operation 210, the video encoder may generate one or more motion vectors used for a current PU (211). The video encoder may perform integer motion estimation and fraction motion estimation, to generate the motion vectors used for the current PU. As described above, a current picture may be associated with two reference picture lists (a list 0 and a list 1). If unidirectional prediction is performed on the current PU, the video encoder may generate list-0 motion vectors or list-1 motion vectors used for the current PU. The list-0 motion vectors may indicate spatial displacement between a picture block of the current PU and reference blocks in reference pictures in the list 0. The list-1 motion vectors may indicate spatial displacement between the picture block of the current PU and reference blocks in reference pictures in the list 1. If bidirectional prediction is performed on the current PU, the video encoder may generate list-0 motion vectors and list-1 motion vectors used for the current PU.

After generating the one or more motion vectors used for the current PU, the video encoder may generate a predictive picture block used for the current PU (212). The video encoder may generate, based on one or more reference blocks indicated by the one or more motion vectors used for the current PU, the predictive picture block used for the current PU.

In addition, the video encoder may generate a candidate predictive motion vector list used for the current PU (213). A video encoder may generate, in various manners, the candidate predictive motion vector list used for the current PU. For example, the video encoder may generate, according to one or more of feasible implementations described below in FIG. 8 to FIG. 12, the candidate predictive motion vector list used for the current PU. In some feasible implementations, when the video encoder generates the candidate predictive motion vector list in the AMVP operation 210, the candidate predictive motion vector list may be limited to two candidate predictive motion vectors. In contrast, when the video encoder generates a candidate predictive motion vector list in a merge operation, the candidate predictive motion vector list may include more candidate predictive motion vectors (for example, five candidate predictive motion vectors).

After generating the candidate predictive motion vector list used for the current PU, the video encoder may generate one or more MVD used for each candidate predictive motion vector in the candidate predictive motion vector list (214). The video encoder may determine a difference between a motion vector indicated by a candidate predictive motion vector and the motion vector corresponding to the current PU to generate a motion vector difference used for the candidate predictive motion vector.

If unidirectional prediction is performed on the current PU, the video encoder may generate a single MVD for each candidate predictive motion vector. If bidirectional prediction is performed on the current PU, the video encoder may generate two MVDs for each candidate predictive motion vector. A first MVD may indicate a difference between a motion vector of a candidate predictive motion vector and a list-0 motion vector of the current PU. A second MVD may indicate a difference between a motion vector of a candidate predictive motion vector and a list-1 motion vector of the current PU.

The video encoder may select one or more candidate predictive motion vectors from the candidate predictive motion vector list (215). The video encoder may select the one or more candidate predictive motion vectors in various manners. For example, the video encoder may select a candidate predictive motion vector of an associated motion vector that matches a to-be-coded motion vector in smallest error, and this can reduce a quantity of bits needed for representing a motion vector difference used for the candidate predictive motion vector.

After selecting the one or more candidate predictive motion vectors, the video encoder may output one or more reference picture indexes used for the current PU, one or more candidate predictive motion vector indexes, and one or more motion vector differences used for the one or more selected candidate predictive motion vectors (216).

In an example in which the current picture is associated with the two reference picture lists (the list 0 and the list 1) and unidirectional prediction is performed on the current PU, the video encoder may output a reference picture index ("ref_idx_10") used for the list 0 or a reference picture index ("ref_idx_11") used for the list 1. The video encoder may further output a candidate predictive motion vector index ("mvp_10_flag") indicating a position of a selected candidate predictive motion vector of a list-0 motion vector used for the current PU in the candidate predictive motion vector list. In addition, the video encoder may output a candidate predictive motion vector index ("mvp_11_flag") indicating a position of a selected candidate predictive motion vector of a list-1 motion vector used for the current PU in the candidate predictive motion vector list. The video encoder may further output an MVD of the list-0 motion vector or the list-1 motion vector used for the current PU.

In an example in which the current picture is associated with the two reference picture lists (the list 0 and the list 1) and bidirectional prediction is performed on the current PU, the video encoder may output a reference picture index ("ref_idx_10") used for the list 0 and a reference picture index ("ref_idx_11") used for the list 1. The video encoder may further output a candidate predictive motion vector index ("mvp_10_flag") indicating a position of a selected candidate predictive motion vector of a list-0 motion vector used for the current PU in the candidate predictive motion vector list. In addition, the video encoder may output a candidate predictive motion vector index ("mvp_11_flag") indicating a position of a selected candidate predictive motion vector of a list-1 motion vector used for the current PU in the candidate predictive motion vector list. The video encoder may further output an MVD of the list-0 motion vector used for the current PU and an MVD of the list-1 motion vector used for the current PU.

Figure 7:
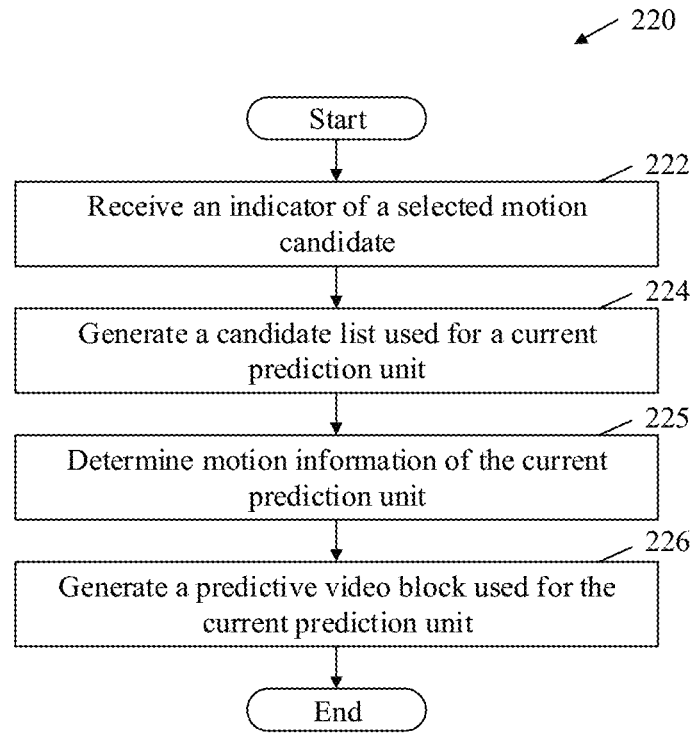
FIG. 7 is an example flowchart of motion compensation performed by a video decoder according to an embodiment of this application.

FIG. 7 is an example flowchart of motion compensation performed by a video decoder (for example, the video decoder 30) according to an embodiment of this application.

When the video decoder performs a motion compensation operation 220, the video decoder may receive an indicator of a selected candidate predictive motion vector used for a current PU (222). For example, the video decoder may receive a candidate predictive motion vector index indicating a position of the selected candidate predictive motion vector in a candidate predictive motion vector list used for the current PU.

If motion information of the current PU is coded in an AMVP mode and bidirectional prediction is performed on the current PU, the video decoder may receive a first candidate predictive motion vector index and a second candidate predictive motion vector index. The first candidate predictive motion vector index indicates a position of a selected candidate predictive motion vector of a list-0 motion vector used 5 for the current PU in the candidate predictive motion vector list. The second candidate predictive motion vector index indicates a position of a selected candidate predictive motion vector of a list-1 motion vector used for the current PU in the candidate predictive motion vector list. In some feasible implementations, a single syntactic element may be used to identify two candidate predictive motion vector indexes.

In addition, the video decoder may generate the candidate predictive motion vector list used for the current PU (224). The video decoder may generate, in various manners, the candidate predictive motion vector list used for the current PU. For example, the video decoder may generate, according to technologies described below in FIG. 8 to FIG. 12, the candidate predictive motion vector list used for the current PU. When the video decoder generates a temporal candidate predictive motion vector used for the candidate predictive motion vector list, the video decoder may explicitly or implicitly set a reference picture index identifying a reference picture including a co-located PU, as described above in FIG. 5.

After generating the candidate predictive motion vector list used for the current PU, the video decoder may determine the motion information of the current PU based on motion information indicated by one or more selected candidate predictive motion vectors in the candidate predictive motion vector list used for the current PU (225). For example, if the motion information of the current PU is coded in a merge mode, the motion information of the current PU may be the same as the motion information indicated by the selected candidate predictive motion vector. If the motion information of the current PU is coded in the AMVP mode, the video decoder may reconstruct one or more motion vectors of the current PU by using one or more motion vectors indicated by the selected candidate predictive motion vector and one or more MVDs indicated in a bitstream. A reference picture index and a prediction direction identifier of the current PU may be the same as reference picture indexes and prediction direction identifiers of the one or more selected candidate predictive motion vectors. After determining the motion information of the current PU, the video decoder may generate, based on one or more reference blocks indicated by the motion information of the current PU, a predictive picture block used for the current PU (226).

Figure 8:
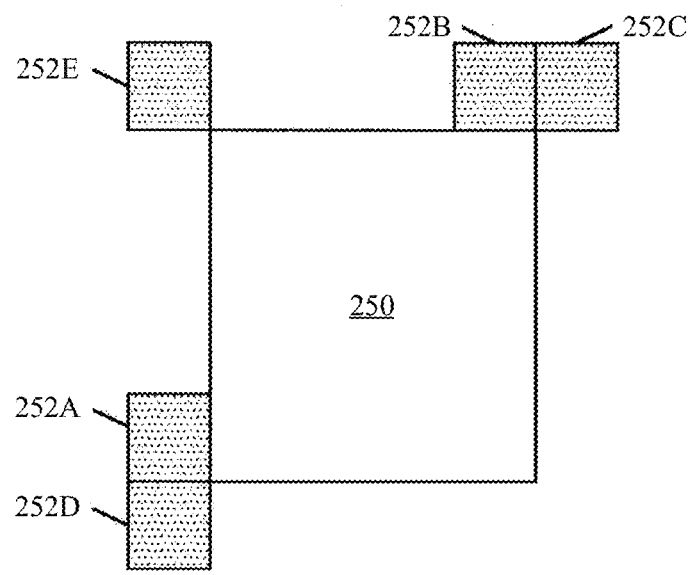
FIG. 8 is an example schematic diagram of a coding unit and picture blocks in neighboring positions associated with the coding unit according to an embodiment of this application.

FIG. 8 is an example schematic diagram of a CU and picture blocks in neighboring positions associated with the coding unit according to an embodiment of this application and is a schematic diagram for illustrating a CU 250 and candidate predictive motion vector positions 252A to 252E associated with the CU 250. In this application, the candidate predictive motion vector positions 252A to 252E may be collectively referred to as candidate predictive motion vector positions 252. The candidate predictive motion vector positions 252 represent spatial candidate predictive motion vectors in a same picture as the CU 250. The candidate predictive motion vector position 252A is located on the left of the CU 250. The candidate predictive motion vector position 252B is located above the CU 250. The candidate predictive motion vector position 252C is located on the upper right of the CU 250. The candidate predictive motion vector position 252D is located on the lower left of the CU 250. The candidate predictive motion vector position 252E is located on the upper left of the CU 250. FIG. 8 shows an illustrative implementation used to provide a manner in which the inter-frame prediction module 121 and a motion compensation unit 82 may generate candidate predictive motion vector lists. The following explains the implementation with reference to the inter-frame prediction module 121, but it should be understood that the motion compensation unit 82 may implement the same technology and thus generate the same candidate predictive motion vector list.

Figure 9:
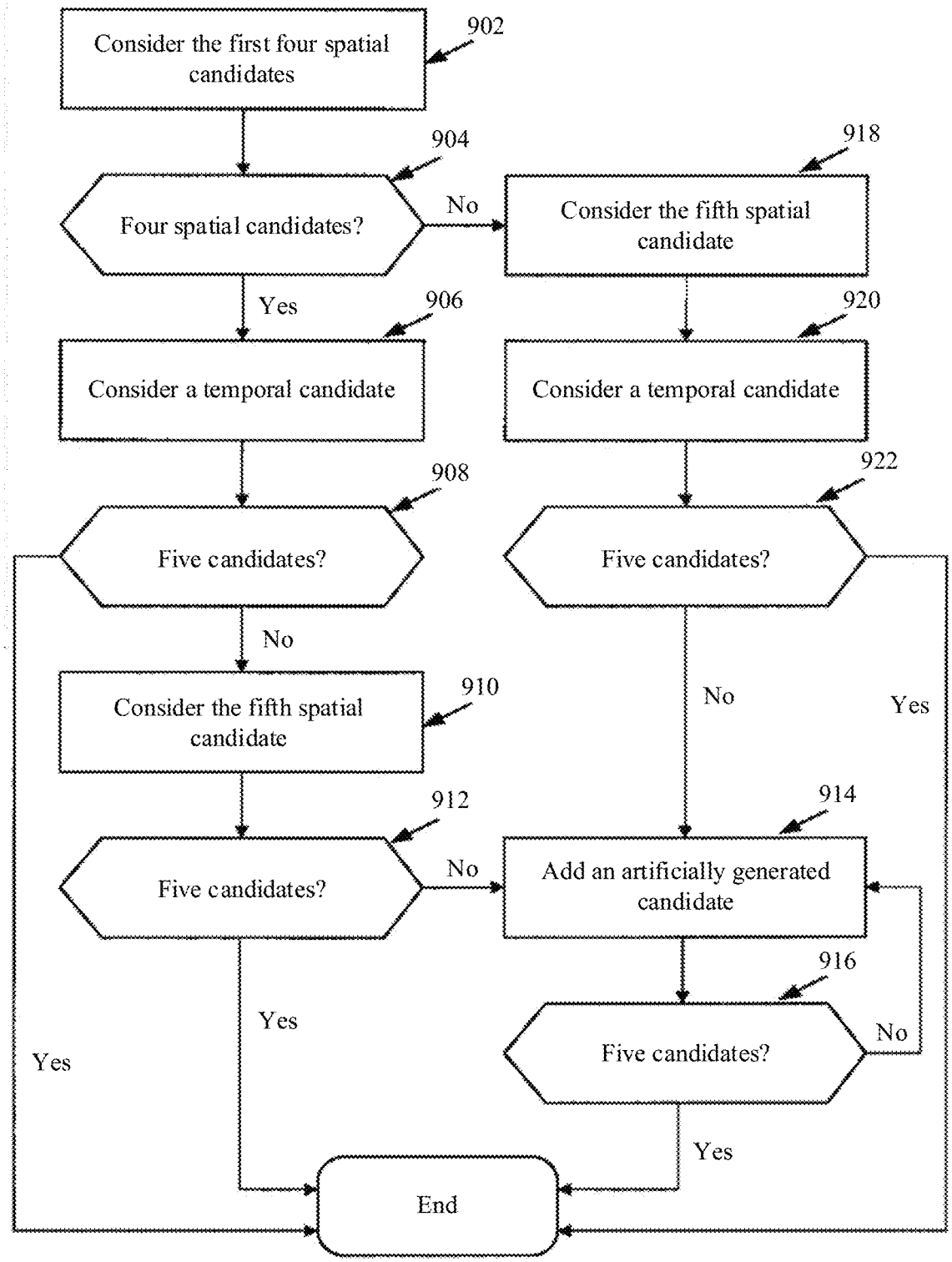
FIG. 9 is an example flowchart of constructing a candidate predictive motion vector list according to an embodiment of this application.

FIG. 9 is an example flowchart of constructing a candidate predictive motion vector list according to an embodiment of this application. A technology in FIG. 9 is to be described with reference to a list including five candidate predictive motion vectors, but the technology described herein may also be used with a list of another size. The five candidate predictive motion vectors may each have an index (for example, 0 to 4). The technology in FIG. 9 is to be described with reference to a general video decoder. The general video decoder may be, for example, a video encoder (for example, the video encoder 20) or a video decoder (for example, the video decoder 30).

To reconstruct the candidate predictive motion vector list in the implementation of FIG. 9, the video decoder first considers four spatial candidate predictive motion vectors (902). The four spatial candidate predictive motion vectors may include candidate predictive motion vector positions 252A, 252B, 252C, and 252D. The four spatial candidate predictive motion vectors may correspond to motion information of four PUs in a same picture as a current CU (for example, the CU 250). The video decoder may consider the four spatial candidate predictive motion vectors in the list in a specified order. For example, the candidate predictive motion vector position 252A may be first considered. If the candidate predictive motion vector position 252A is available, the candidate predictive motion vector position 252A may be assigned to an index 0. If the candidate predictive motion vector position 252A is unavailable, the video decoder may not add the candidate predictive motion vector position 252A to the candidate predictive motion vector list. A candidate predictive motion vector position may be unavailable for various reasons. For example, if the candidate predictive motion vector position is not within a current picture, the candidate predictive motion vector position may be unavailable. In another feasible implementation, if a candidate predictive motion vector position is intra-frame predicted, the candidate predictive motion vector position may be unavailable. In another feasible implementation, if a candidate predictive motion vector position is in a slice different from that of the current CU, the candidate predictive motion vector position may be unavailable.

After considering the candidate predictive motion vector position 252A, the video decoder may then consider the candidate predictive motion vector position 252B. If the candidate predictive motion vector position 252B is available and different from the candidate predictive motion vector position 252A, the video decoder may add the candidate predictive motion vector position 252B to the candidate predictive motion vector list. In this specific context, the term "same" or "different" means that motion information associated with candidate predictive motion vector positions is the same or different. Therefore, if two candidate predictive motion vector positions have same motion information, the two candidate predictive motion vector positions are considered to be the same, or if the two candidate predictive motion vector positions have different motion information, the two candidate predictive motion vector positions are considered to be different. If the candidate predictive motion vector position 252A is unavailable, the video decoder may assign the candidate predictive motion vector position 252B to the index 0. If the candidate predictive motion vector position 252A is available, the video decoder may assign the candidate predictive motion vector position 252B to an index 1. If the candidate predictive motion vector position 252B is unavailable or the same as the candidate predictive motion vector position 252A, the video decoder skips the candidate predictive motion vector position 252B and does not add the candidate predictive motion vector position 252B to the candidate predictive motion vector list.

Similarly, the video decoder considers the candidate predictive motion vector position 252C and adds the candidate predictive motion vector position 252C to the list. If the candidate predictive motion vector position 252C is available and different from the candidate predictive motion vector positions 252B and 252A, the video decoder may assign the candidate predictive motion vector position 252C to a next available index. If the candidate predictive motion vector position 252C is unavailable or the same as at least one of the candidate predictive motion vector positions 252A and 252B, the video decoder does not add the candidate predictive motion vector position 252C to the candidate predictive motion vector list. Next, the video decoder considers the candidate predictive motion vector position 252D. If the candidate predictive motion vector position 252D is available and different from the candidate predictive motion vector positions 252A, 252B, and 252C, the video decoder may assign the candidate predictive motion vector position 252D to a next available index. If the candidate predictive motion vector position 252D is unavailable or the same as at least one of the candidate predictive motion vector positions 252A, 252B, and 252C, the video decoder does not add the candidate predictive motion vector position 252D to the candidate predictive motion vector list. The above implementation generally describes the example in which the candidate predictive motion vectors 252A to 252D are considered to be added to the candidate predictive motion vector list, but in some implementations, all the candidate predictive motion vectors 252A to 252D may be first added to the candidate predictive motion vector list, and then a repeated candidate predictive motion vector is removed from the candidate predictive motion vector list.

After the video decoder considers the first four spatial candidate predictive motion vectors, the candidate predictive motion vector list may include the four spatial candidate predictive motion vectors, or the list may include fewer than four spatial candidate predictive motion vectors. If the list includes the four spatial candidate predictive motion vectors (904, yes), the video decoder considers a temporal candidate predictive motion vector (906). The temporal candidate predictive motion vector may correspond to motion information of a co-located PU of a picture different from the current picture. If the temporal candidate predictive motion vector is available and different from the first four spatial candidate predictive motion vectors, the video decoder considers assigning the temporal candidate predictive motion vector to an index 4. If the temporal candidate predictive motion vector is unavailable or the same as one of the first four spatial candidate predictive motion vectors, the video decoder does not add the temporal candidate predictive motion vector to the candidate predictive motion vector list. Therefore, after the video decoder considers the temporal candidate predictive motion vector (906), the candidate predictive motion vector list may include five candidate predictive motion vectors (the first four spatial candidate predictive motion vectors considered in block 902 and the temporal candidate predictive motion vector considered in block 904) or may include four candidate predictive motion vectors (the first four spatial candidate predictive motion vectors considered in block 902). If the candidate predictive motion vector list includes five candidate predictive motion vectors (908, yes), the video decoder completes constructing the list.

If the candidate predictive motion vector list includes four candidate predictive motion vectors (908, no), the video decoder may consider the fifth spatial candidate predictive motion vector (910). The fifth spatial candidate predictive motion vector may (for example) correspond to a candidate predictive motion vector position 252E. If the candidate predictive motion vector in the position 252E is available and different from the candidate predictive motion vectors in the positions 252A, 252B, 252C, and 252D, the video decoder may add the fifth spatial candidate predictive motion vector to the candidate predictive motion vector list, and assign the fifth spatial candidate predictive motion vector to an index 4. If the candidate predictive motion vector in the position 252E is unavailable or the same as the candidate predictive motion vectors in the positions 252A, 252B, 252C, and 252D, the video decoder may not add the candidate predictive motion vector in the position 252E to the candidate predictive motion vector list. Therefore, after the fifth spatial candidate predictive motion vector is considered (910), the list may include five candidate predictive motion vectors (the first four spatial candidate predictive motion vectors considered in block 902 and the fifth spatial candidate predictive motion vector considered in block 910) or may include four candidate predictive motion vectors (the first four spatial candidate predictive motion vectors considered in block 902).

If the candidate predictive motion vector list includes five candidate predictive motion vectors (912, yes), the video decoder completes generating the candidate predictive motion vector list. If the candidate predictive motion vector list includes four candidate predictive motion vectors (912, no), the video decoder adds an artificially generated candidate predictive motion vector (914) until the list includes five candidate predictive motion vectors (916, yes).

If the list includes fewer than four spatial candidate predictive motion vectors (904, no) after the video decoder considers the first four spatial candidate predictive motion vectors, the video decoder may consider the fifth spatial candidate predictive motion vector (918). The fifth spatial candidate predictive motion vector may (for example) correspond to a candidate predictive motion vector position 252E. If the candidate predictive motion vector in the position 252E is available and different from the candidate predictive motion vectors included in the candidate predictive motion vector list, the video decoder may add the fifth spatial candidate predictive motion vector to the candidate predictive motion vector list, and assign the fifth spatial candidate predictive motion vector to a next available index. If the candidate predictive motion vector in the position 252E is unavailable or the same as one of the candidate predictive motion vectors included in the candidate predictive motion vector list, the video decoder may not add the candidate predictive motion vector in the position 252E to the candidate predictive motion vector list. Next, the video decoder may consider a temporal candidate predictive motion vector (920). If the temporal candidate predictive motion vector is available and different from the candidate predictive motion vectors included in the candidate predictive motion vector list, the video decoder may add the temporal candidate predictive motion vector to the candidate predictive motion vector list, and assign the temporal candidate predictive motion vector to a next available index. If the temporal candidate predictive motion vector is unavailable or the same as one of the candidate predictive motion vectors included in the candidate predictive motion vector list, the video decoder may not add the temporal candidate predictive motion vector to the candidate predictive motion vector list.

If the candidate predictive motion vector list includes five candidate predictive motion vectors (922, yes) after the fifth spatial candidate predictive motion vector (in block 918) and the temporal candidate predictive motion vector (in block 920) are considered, the video decoder completes generating the candidate predictive motion vector list. If the candidate predictive motion vector list includes fewer than five candidate predictive motion vectors (922, no), the video decoder adds an artificially generated candidate predictive motion vector (914) until the list includes five candidate predictive motion vectors (916, yes).

According to the technologies of this application, an additional merge candidate predictive motion vector may be artificially generated after the spatial candidate predictive motion vectors and the temporal candidate predictive motion vector, so that a size of a merge candidate predictive motion vector list is fixed to a specified quantity (for example, five in the feasible implementation of FIG. 9 above) of merge candidate predictive motion vectors. The additional merge candidate predictive motion vector may include examples of a combined bidirectional predictive merge candidate predictive motion vector (a candidate predictive motion vector 1), a scaled bidirectional predictive merge candidate predictive motion vector (a candidate predictive motion vector 2), and a zero vector merge/AMVP candidate predictive motion vector (a candidate predictive motion vector 3).

Figure 10:
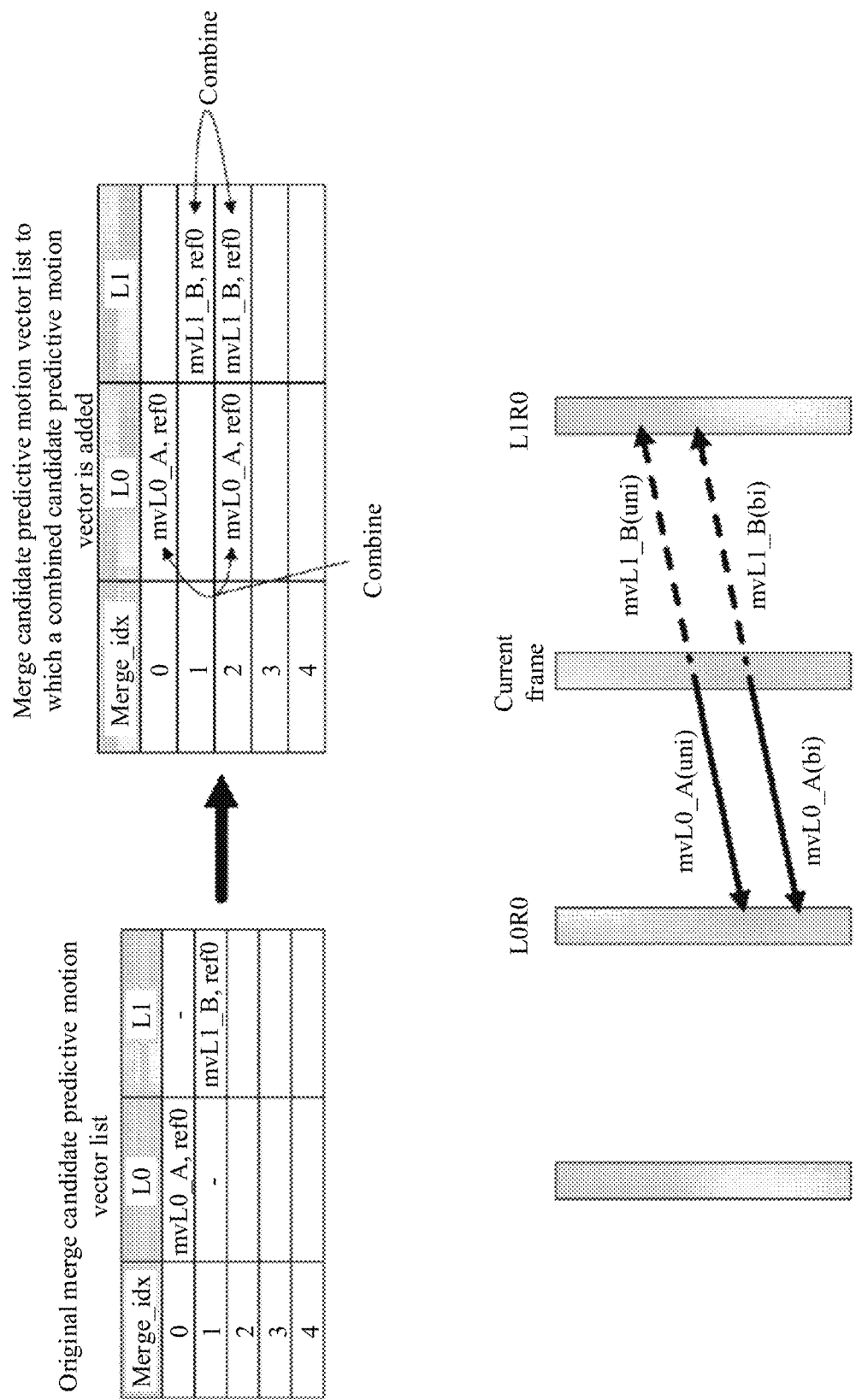
FIG. 10 is an example schematic diagram of adding a combined candidate motion vector to a merge-mode candidate predictive motion vector list according to an embodiment of this application.

FIG. 10 is an example schematic diagram of adding a combined candidate motion vector to a merge-mode candidate predictive motion vector list according to an embodiment of this application. A combined bidirectional predictive merge candidate predictive motion vector may be generated by combining original merge candidate predictive motion vectors. Specifically, two candidate predictive motion vectors (which has mvL0 and refldxL0 or has mvL1 and refldxL1) in the original candidate predictive motion vectors may be used to generate the bidirectional predictive merge candidate predictive motion vector. In FIG. 10, two candidate predictive motion vectors are included in an original merge candidate predictive motion vector list. A prediction type of one candidate predictive motion vector is unidirectional prediction by using a list 0, and a prediction type of the other candidate predictive motion vector is unidirectional prediction by using a list 1. In this feasible implementation, mvL0_A and ref0 are taken from the list 0, and mvL1_B and ref0 are taken from the list 1. Then a bidirectional predictive merge candidate predictive motion vector (which has mvL0_A and ref0 in the list 0 and mvL1_B and ref0 in the list 1) may be generated, and it is checked whether the bidirectional predictive merge candidate predictive motion vector is different from a candidate predictive motion vector that has been included in a candidate predictive motion vector list. If the bidirectional predictive merge candidate predictive motion vector is different from the candidate predictive motion vector, the video decoder may add the bidirectional predictive merge candidate predictive motion vector to the candidate predictive motion vector list.

Figure 11:
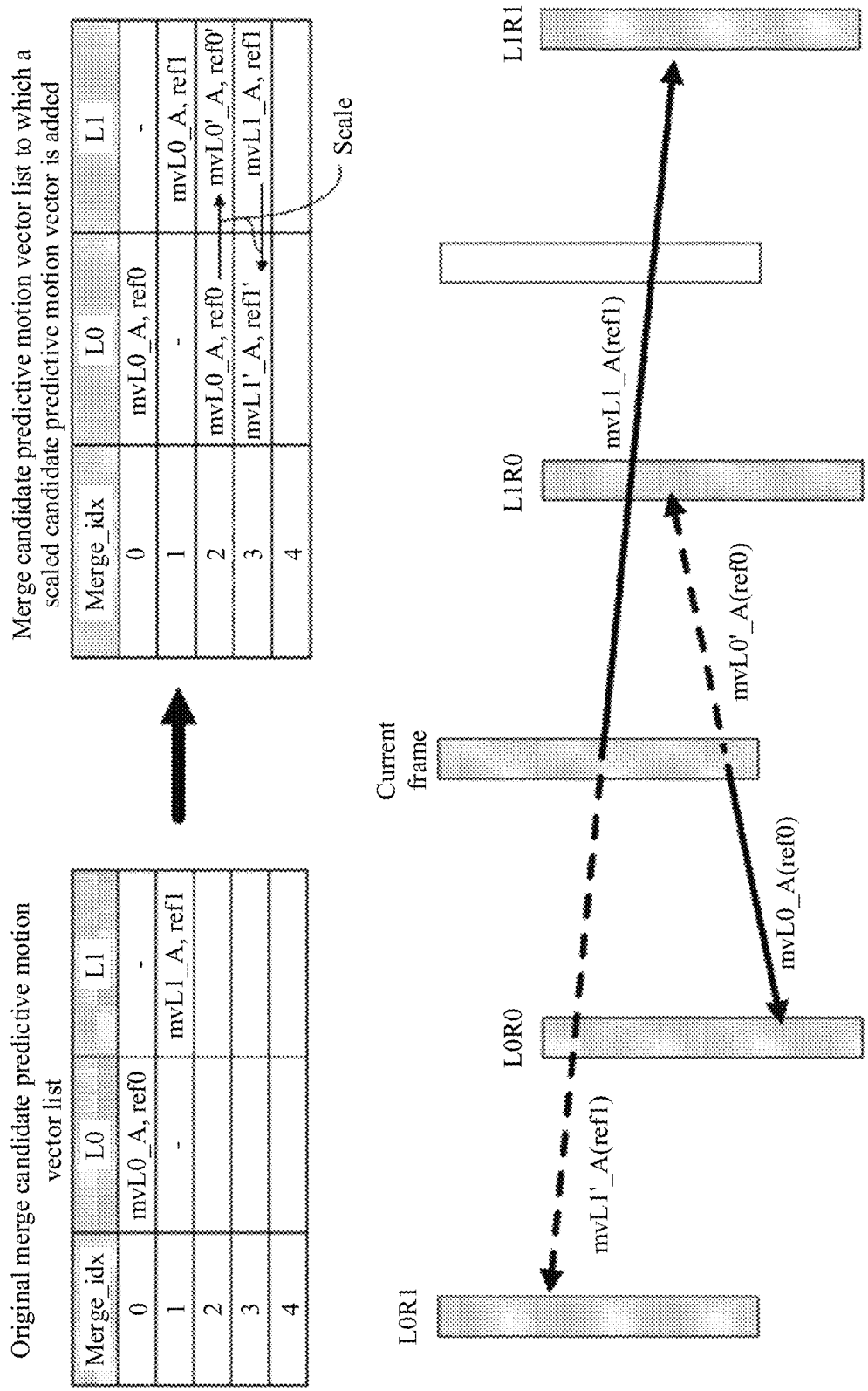
FIG. 11 is an example schematic diagram of adding a scaled candidate motion vector to a merge-mode candidate predictive motion vector list according to an embodiment of this application.

FIG. 11 is an example schematic diagram of adding a scaled candidate motion vector to a merge-mode candidate predictive motion vector list according to an embodiment of this application. A scaled bidirectional predictive candidate predictive motion vector may be generated by scaling an original merge candidate predictive motion vector. Specifically, one candidate predictive motion vector (which has mvLX and refldxLX) in original candidate predictive motion vectors may be used to generate the bidirectional predictive merge candidate predictive motion vector. In a feasible implementation of FIG. 11, two candidate predictive motion vectors are included in an original merge candidate predictive motion vector list. A prediction type of one candidate predictive motion vector is unidirectional prediction by using a list 0, and a prediction type of the other candidate predictive motion vector is unidirectional prediction by using a list 1. In this feasible implementation, mvL0_A and ref0 may be taken from the list 0, and ref0 may be copied to a reference index ref0' in the list 1. Next, mvL0'_A may be calculated by scaling mvL0_A with ref0 and ref0'. Scaling may depend on a POC distance. Next, a bidirectional predictive merge candidate predictive motion vector (which has mvL0_A and ref0 in the list 0 and mvL0'_A and ref0' in the list 1) may be generated and it is checked whether the bidirectional predictive merge candidate predictive motion vector is repeated. If the bidirectional predictive merge candidate predictive motion vector is not repeated, the bidirectional predictive merge candidate predictive motion vector may be added to a merge candidate predictive motion vector list.

Figure 12:
FIG. 12 is an example schematic diagram of adding a zero motion vector to a merge-mode candidate predictive motion vector list according to an embodiment of this application.

FIG. 12 is an example schematic diagram of adding a zero motion vector to a merge-mode candidate predictive motion vector list according to an embodiment of this application. A zero-vector merge candidate predictive motion vector may be generated by combining a zero vector and a reference index that may be referenced. If a zero-vector candidate predictive motion vector is not repeated, the zero-vector candidate predictive motion vector may be added to a merge candidate predictive motion vector list. For each generated merge candidate predictive motion vector, motion information may be compared with motion information of a previous candidate predictive motion vector in the list.

In a feasible implementation, if a newly generated candidate predictive motion vector is different from a candidate predictive motion vector that has been included in the candidate predictive motion vector list, the generated candidate predictive motion vector is added to the merge candidate predictive motion vector list. A process of determining whether a candidate predictive motion vector is different from a candidate predictive motion vector that has been included in the candidate predictive motion vector list is sometimes referred to as pruning. By pruning, each newly generated candidate predictive motion vector may be compared with an existing candidate predictive motion vector in the list. In some feasible implementations, the pruning operation may include comparing one or more new candidate predictive motion vectors with candidate predictive motion vectors that have been in the candidate predictive motion vector list and not adding a new candidate predictive motion vector that is a repeat of a candidate predictive motion vector that has been in the candidate predictive motion vector list. In some other feasible implementations, the pruning operation may include adding one or more new candidate predictive motion vectors to the candidate predictive motion vector list and then removing a repeated candidate predictive motion vector from the list.

In a feasible implementation of this application, in interframe prediction, a method for predicting motion information of a to-be-processed picture block includes: obtaining motion information of at least one determined motion vector picture block in a picture in which a to-be-processed picture block is located, where the at least one determined motion vector picture block includes a determined motion vector picture block discontiguous to the to-be-processed picture block; obtaining first identification information, where the first identification information is used to determine target motion information from the motion information of the at least one determined motion vector picture block; and predicting motion information of the to-be-processed picture block based on the target motion information.

Figure 13:
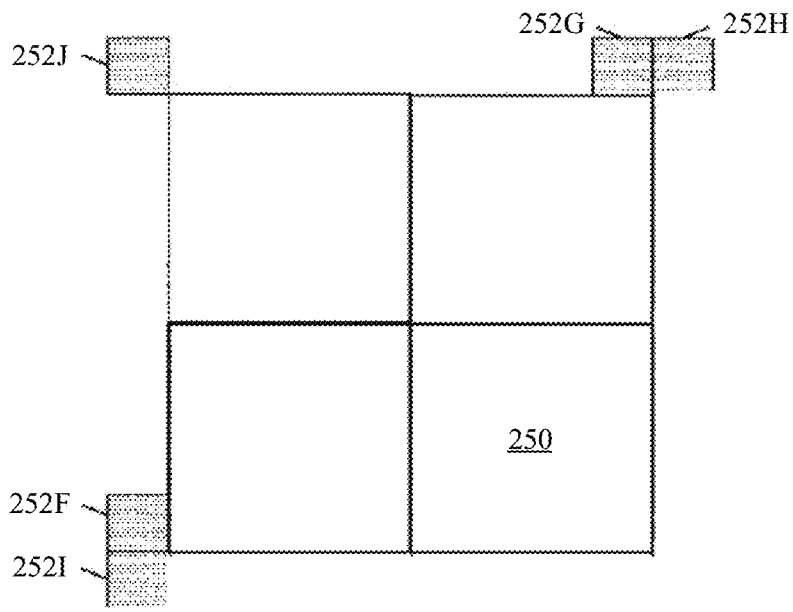
FIG. 13 is another example schematic diagram of a coding unit and picture blocks in neighboring positions associated with the coding unit according to an embodiment of this application.

In the foregoing feasible implementations in FIG. 5 to FIG. 7 and FIG. 9 to FIG. 12, for example, a spatial candidate prediction mode is from the five positions 252A to 252E shown in FIG. 8, namely, positions contiguous to the to-be-processed picture block. On the basis of the foregoing feasible implementations in FIG. 5 to FIG. 7 and FIG. 9 to FIG. 12, in some feasible implementations, for example, a spatial candidate prediction mode may further include a position that is within a preset distance from the to-be-processed picture block but discontiguous to the to-be-processed picture block. For example, this type of position may be 252F to 252J shown in FIG. 13. It should be understood that FIG. 13 is an example schematic diagram of a coding unit and picture blocks in neighboring positions associated with the coding unit according to an embodiment of this application. A position of a picture block that is located in a same picture frame as the to-be-processed picture block, that has been reconstructed when the to-be-processed picture block is processed, and that is discontiguous to the to-be-processed picture block falls within a range of this type of position.

This type of position is referred to as a spatially discontiguous picture block, and it is assumed that a first spatially discontiguous picture block, a second spatially discontiguous picture block, and a third spatially discontiguous picture block are available. For a physical meaning of "available", refer to the foregoing description. Details are not described again. In addition, it is assumed that when the spatial candidate prediction mode is selected from prediction modes in positions shown in FIG. 8, checking is performed and a candidate prediction motion mode list is constructed in the following order. It should be understood that the checking includes the foregoing "available" checking and pruning process, and details are not described again. The candidate prediction mode list includes: a motion vector of a picture block in a position 252A, a motion vector of a picture block in a position 252B, a motion vector of a picture block in a position 252C, a motion vector of a picture block in a position 252D, a motion vector obtained by using an alternative temporal motion vector prediction (ATMVP) technology, a motion vector of a picture block in a position 252E, and a motion vector obtained by using a spatial-temporal motion vector prediction (STMVP) technology. The ATMVP technology and the STMVP technology are recorded in detail in sections 2.3.1.1 and 2.3.1.2 of JVET-F1001-v2, and JVET-F1001-v2 is introduced herein in this specification. Details are not described. It should be understood that, for example, the candidate prediction mode list includes the foregoing seven predictive motion vectors. According to different specific implementations, a quantity of predictive motion vectors included in the candidate prediction mode list may be smaller than 7. For example, the first five predictive motion vectors are selected to form the candidate prediction mode list. Alternatively, the motion vectors constructed in the feasible implementations in FIG. 10 to FIG. 12 described above may be further added to the candidate prediction mode list, so that the candidate prediction mode list includes more predictive motion vectors. In a feasible implementation, the first spatially discontiguous picture block, the second spatially discontiguous picture block, and third spatially discontiguous picture block may be added to the candidate prediction mode list, and are used as predictive motion vectors of the to-be-processed picture block. Further, it is assumed that the motion vector of the picture block in the position 252A, the motion vector of the picture block in the position 252B, the motion vector of the picture block in the position 252C, the motion vector of the picture block in the position 252D, the motion vector obtained by using the ATMVP technology, the motion vector of the picture block in the position 252E, and the motion vector obtained by using the STMVP technology are MVL, MVU, MVUR, MVDL, MVA, MVUL, and MVS respectively. It is assumed that motion vectors of the first spatially discontiguous picture block, the second spatially discontiguous picture block, and third spatially discontiguous picture block are MV0, MV1, and MV2 respectively, and checking may be performed and a candidate predictive motion vector list may be constructed in the following orders:

example 1: MVL, MVU, MVUR, MVDL, MV0, MV1, MV2, MVA, MVUL, and MVS;

example 2: MVL, MVU, MVUR, MVDL, MVA, MV0, MV1, MV2, MVUL, and MVS;

example 3: MVL, MVU, MVUR, MVDL, MVA, MVUL, MV0, MV1, MV2, and MVS;

example 4: MVL, MVU, MVUR, MVDL, MVA, MVUL, MVS, MV0, MV1, and MV2;

example 5: MVL, MVU, MVUR, MVDL, MVA, MV0, MVUL, MV1, MVS, and MV2;

example 6: MVL, MVU, MVUR, MVDL, MVA, MV0, MVUL, MV1, MV2, and MVS; and example 7: MVL, MVU, MVUR, MVDL, MVA, MVUL, MV1, MV0, MV2, and MVS.

It should be understood that the candidate predictive motion vector lists may be used in the merge mode or the AMVP mode described above or in another prediction mode for obtaining a predictive motion vector of the to-be-processed picture block, and may be used for an encoder side or may also be used for a decoder side corresponding to the encoder side. This is not limited. In addition, a quantity of candidate predictive motion vectors in the candidate predictive motion vector list is also preset, and is consistent at the encoder side and the decoder side. A specific quantity is not limited.

It should be understood that, in example 1 to example 7, several feasible composition manners of the candidate predictive motion vector list are provided as examples. Based on a motion vector of a spatially discontiguous picture block, there may be another composition manner of the candidate predictive motion vector list and another arrangement manner of candidate predictive motion vectors in the list. This is not limited.

It should be understood that motion vectors (for example, MV0, MV1, and MV2) of different spatially discontiguous picture blocks may also be arranged in different manners, which are described in detail in the following implementations.

Compared with a feasible implementation in which only the spatial candidate prediction mode shown in FIG. 8 is used, in a candidate prediction mode in which a motion vector of a spatially discontiguous picture block is further used as a candidate predictive motion vector of a to-be-processed block, more spatial prior coding information is used, and coding performance is improved.

Figure 14:
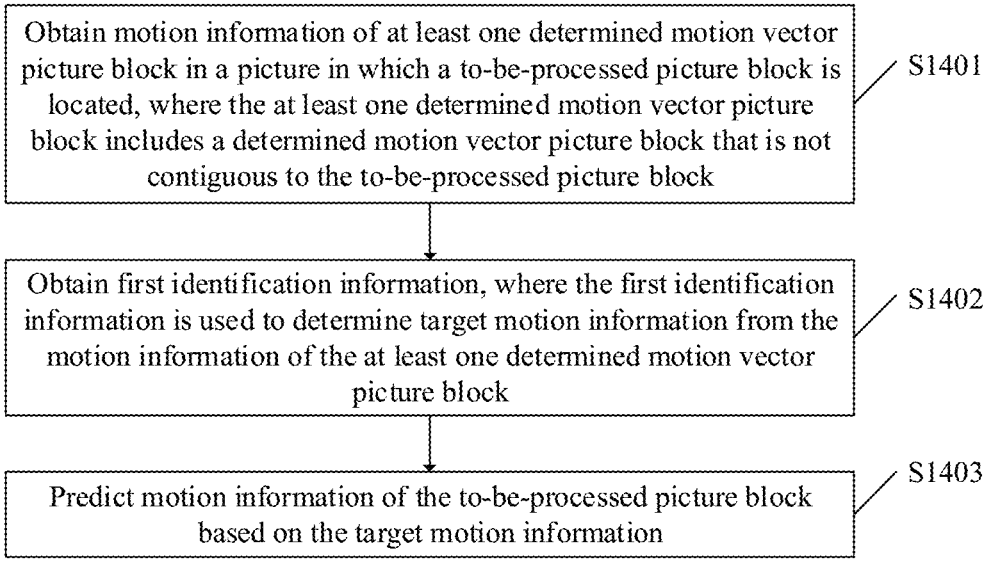
FIG. 14 is an example flowchart of a motion vector prediction method according to an embodiment of this application.

FIG. 14 is an example flowchart of a motion vector prediction method according to an embodiment of this application. A method for predicting motion information of a picture block is used for inter-frame prediction, and includes the following steps.

S1401. Obtain motion information of at least one determined motion vector picture block in a picture in which a to-be-processed picture block is located, where the at least one determined motion vector picture block includes a determined motion vector picture block discontiguous to the to-be-processed picture block.

Figure 15:
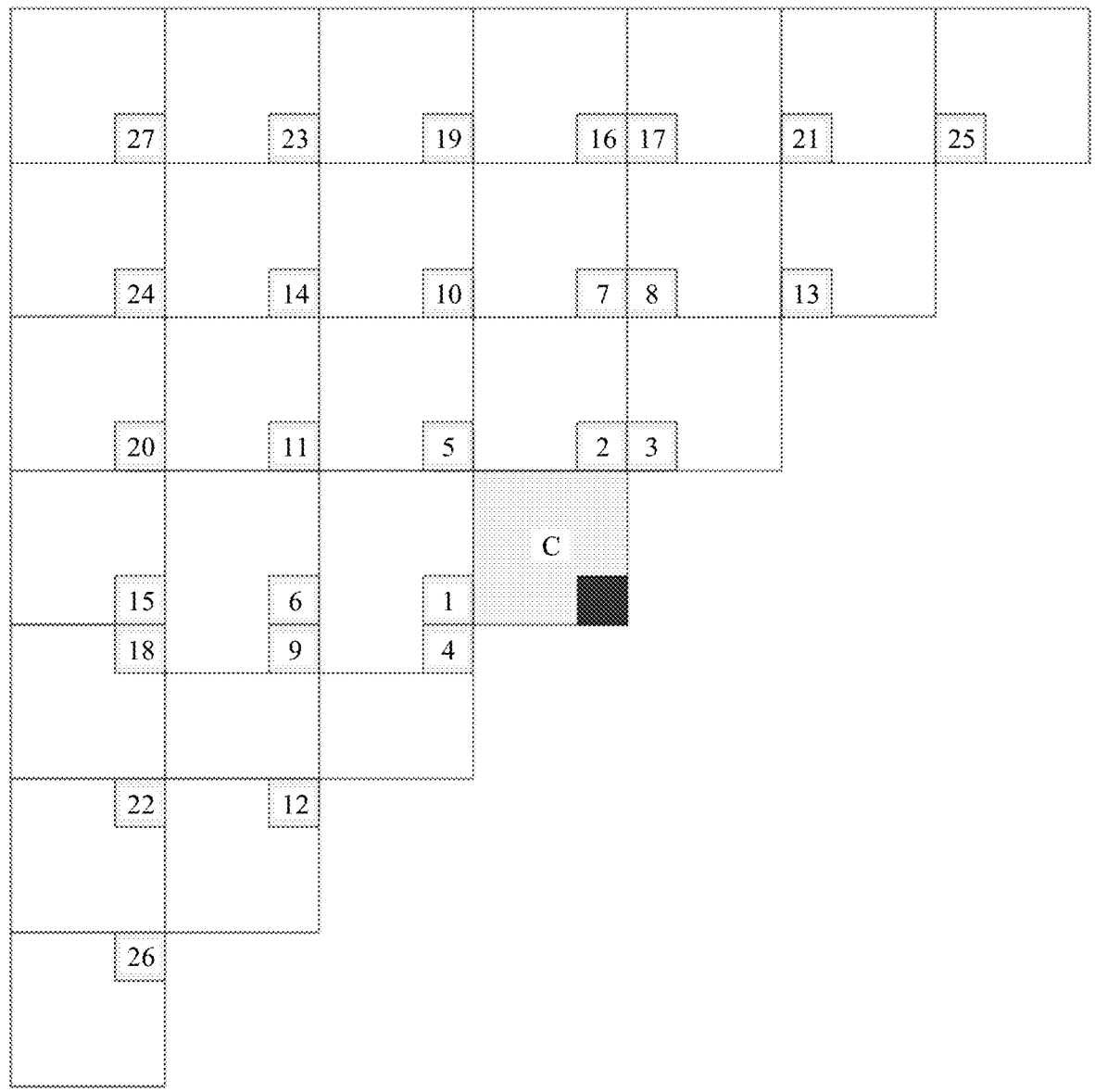
FIG. 15 is still another example schematic diagram of a coding unit and picture blocks in neighboring positions associated with the coding unit according to an embodiment of this application.

Specifically, FIG. 15 is still another example schematic diagram of a coding unit and picture blocks in neighboring positions associated with the coding unit according to an embodiment of this application. Before the to-be-processed picture block is coded or decoded, the plurality of spatially contiguous picture blocks have been reconstructed, to be specific, motion vectors of the plurality spatially contiguous picture blocks have been determined. When any one of the plurality of spatially contiguous picture blocks is unavailable, to be specific, is an intra-frame coded block or is beyond a picture, a slice, a sheet boundary, or the like, the picture block may be excluded in a subsequent operation, or a motion vector may be assigned to the picture block according to a preset rule, and the picture block is still used in a subsequent operation. It is clearly that the plurality of spatially contiguous picture blocks include the determined motion vector picture block discontiguous to the to-be-processed picture block, for example, picture blocks in which pixel sets marked as 6 to 27 in FIG. 15 are located.

In a feasible implementation, the picture blocks in which pixel sets marked as 1 to 27 are located in FIG. 15 do not represent the PU or the CU described above. The following describes an example of FIG. 15 in detail. A large rectangular block marked as C is the to-be-processed picture block. Small rectangles marked as 1 to 27 are set as basic pixel units, a length of the large rectangle is w basic pixel units, a height of the large rectangle is h basic pixel units, w and h are both positive integers, and a size of a picture block in which each small rectangle is located is the same as a size of the to-be-processed picture block. A basic pixel unit may be a pixel, or may be a 4×4 pixel set, or may be a 4×2 pixel set, or may be a pixel set of another size. This is not limited.

A position of a pixel set basic unit in a lower right corner of the to-be-processed picture block in the picture is an origin; a straight line on which a bottom boundary of the to-be-processed picture block is located is a horizontal coordinate axis, and a right direction is a horizontal positive direction; and a straight line on which a right boundary of the to-be-processed picture block is located is a vertical coordinate axis, and a downward direction is a vertical positive direction. A virtual coordinate system is established on a picture plane in which the to-be-processed picture block is located, and coordinates of the small rectangles marked as 1 to 27 are $(-w, 0)$, $(0, -h)$, $(1, -h)$, $(-w, 1)$, $(-w, -h)$, $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times (w+1), -3 \times h)$, $(-3 \times w, 2 \times h+1)$, and $(-3 \times w, -3 \times h)$, respectively.

It should be understood that FIG. 15 shows an example feasible implementation of a coding unit and picture blocks in neighboring positions associated with the coding unit according to this embodiment of this application. A quantity of the spatially contiguous picture blocks may be larger than 27, or may be smaller than 27. This is not limited.

In the implementation corresponding to FIG. 15, the obtaining motion information of at least one determined motion vector picture block in a picture in which the to-be-processed picture block is located is obtaining motion information of at least one basic pixel unit in a position of the basic pixel units marked as 1 to 27.

Compared with a feasible implementation in which only the spatial candidate prediction mode shown in FIG. 8 is used, in a candidate prediction mode in which a motion vector of a spatially discontiguous picture block is further used as a candidate predictive motion vector of a to-be-processed block, more spatial prior coding information is used, and coding performance is improved.

Specifically, a manner of obtaining the motion information of the at least one determined motion vector picture block in the picture in which the to-be-processed picture block is located includes:

In a feasible implementation, that the picture in which the to-be-processed picture block is located includes at least two rows of coding tree units (CTU), and a size of the to-be-processed picture block is not larger than a size of the coding tree unit includes: a difference between a number of a row of a coding tree unit in which the to-be-processed picture block is located in the picture and a number of a row of a coding tree unit in which the determined motion vector picture block is located in the picture is smaller than N rows, where N is an integer greater than 1. In some video compression standards, a picture is coded by using a CTU as a division unit, the CTU is also referred to as a largest coding unit (LCU), and the CTU is further divided into CUs for coding.

Specifically, it is assumed that a length of a CTU is 2-fold w, a height of the CTU is 2-fold h, and the to-be-processed picture block C is located in an upper left corner of a CTU. In FIG. 15, a number of a row of a CTU in which the determined motion vector picture block is located and a number of a row of a CTU in which the to-be-processed picture block is located are 2, where basic pixel units marked as 27, 23, 19, 16, 17, 21, and 25 are located in the determined motion vector picture block. When N is 2, motion vectors of the basic pixel units marked as 27, 23, 19, 16, 17, 21, and 25 cannot be used as predictive motion vectors of the to-be-processed picture block.

In some feasible implementations, similarly, motion vectors of basic pixel units marked as 24, 20, 25, and 15 cannot be used as the predictive motion vector of the to-be-processed picture block.

In some feasible implementations, similarly, motion vectors of basic pixel units marked as 18, 22, and 26 cannot be used as the predictive motion vector of the to-be-processed picture block, either.

A position of a basic pixel unit is limited within a specified range, so that an excessive storage or access operation of a motion vector can be avoided, and data processing efficiency is improved while specific coding performance is maintained.

In a feasible implementation, obtaining an order of the motion information of the at least one determined motion vector picture block in the picture in which the to-be-processed picture block is located includes:

It is assumed that the picture in which the to-be-processed picture block is located includes M groups of the determined motion vector picture blocks, and each group of the determined motion vector picture blocks has a group number. Determined motion vector picture blocks of a group number i include determined motion vector picture blocks in which pixel set basic units in the following coordinate positions in the virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, where m is any integer ranging from 0 to i−1 (including 0 and i−1), M and i are positive integers, and i is not greater than M.

Specifically, referring to FIG. 15, the to-be-processed picture block C is used as a center, determined motion vector picture blocks in which basic pixel units marked as 3, 2, 5, 1, and 4 are located are in a first group, and have a group number 1; determined motion vector picture blocks in which basic pixel units marked as 13, 8, 7, 10, 14, 11, 6, 9, and 12 are located are in a second group, and have a group number 2; and determined motion vector picture blocks in which basic pixel units marked as 25, 21, 17, 16, 19, 23, 27, 24, 20, 15, 18, 22, and 26 are located are in a third group, and have a group number 3.

The obtaining motion information of at least one determined motion vector picture block in a picture in which the to-be-processed picture block is located includes: successively obtaining motion information of the to-be-obtained determined motion vector picture blocks in ascending order of group numbers of the to-be-obtained determined motion vector picture blocks. To be specific, motion information of the determined motion vector picture blocks in which the basic pixel units are located is successively obtained in an order of the first group, the second group, and the third group.

In a feasible implementation, when at least two to-be-obtained determined motion vector picture blocks have a same group number, the successively obtaining motion information of the to-be-obtained determined motion vector picture block includes: successively obtaining motion information of the at least two to-be-obtained determined motion vector picture blocks in ascending order of distances from the at least two to-be-obtained determined motion vector picture blocks to the origin, where the distance is a sum of a horizontal coordinate absolute value and a vertical coordinate absolute value of a pixel set basic unit in a preset position in the to-be-obtained determined motion vector picture block in the virtual coordinate system.

Specifically, in a same group, distances from basic pixel units to a preset basic pixel unit in the to-be-processed picture block are compared, and motion information of a determined motion vector picture block in which a basic pixel unit with a shorter distance is located is first obtained. It is assumed that the preset basic pixel unit in the to-be-processed picture block is located in a lower right corner of the picture block, namely, an origin position of the virtual coordinate system. Obtaining motion information in the second group includes:

(1) A distance from each basic pixel unit to the origin position is calculated, where a distance calculation manner is to calculate a sum of a horizontal coordinate absolute value and a vertical coordinate absolute values from each basic pixel unit to the origin position. It should be understood that when the preset basic pixel unit is not the origin, a distance calculation manner is to calculate a sum of an absolute value of a horizontal coordinate difference and an absolute value of a vertical coordinate difference between each basic pixel unit and the preset basic pixel unit.

A distance D13 between the origin and a basic pixel unit marked as 13 is w+1+2×h. Similarly, D8 is 1+2×h, D7 is 2×h, D10 is w+2×h, D14 is 2×w+2×h, D1 is 2×w+h, D9 is 2×w, D6 is 2×w+1, and D12 is 2×w+h+1. It is assumed that w is equal to h. In this case, D13 is 3×h+1, D8 is 2×h+1, D7 is 2×h, D10 is 3×h, D14 is 4×h, D11 is 3×h, D9 is 2×h, D6 is 2×h+1, and D12 is 3×h+1.

(2) The motion information of the to-be-obtained determined motion vector picture blocks is successively obtained in ascending order of distances. When distances are the same, the motion information of the to-be-obtained determined motion vector picture blocks is successively obtained according to a preset rule (for example, in an order from left to right and from top to bottom, provided that the order is consistent at an encoder side and a decoder side. This is not limited).

For example, an obtaining order of the motion information in the second group may be obtaining motion information of determined motion vector picture blocks in which basic pixel units marked as 6, 7, 9, 8, 10, 11, 12, 13, and 14 are located.

It should be understood that, according to the preset rule, an obtaining order of motion information of determined motion vector picture blocks in which basic pixel units that have a same distance are located may be exchanged. To be specific, the obtaining order may be obtaining the motion information of the determined motion vector picture blocks in which basic pixel units marked as 7, 6, 9, 8, 11, 10, 12, 13, and 14 are located. There may be another preset rule and a corresponding obtaining order. This is not limited.

The motion information of the determined motion vector picture block is obtained according to a correlation between the motion information of the determined motion vector picture block and the motion information of the to-be-processed picture block, to predict the motion information of the to-be-processed picture block. This improves coding efficiency.

With reference to the foregoing two feasible implementations, referring to FIG. 15, for example, an order of obtaining spatial candidate predictive motion vector is successively obtaining, in an obtaining order of basic pixel units marked as 1, 2, 3, 4, 5, 6, 7, 8, 9, 10, 11, 12, 13, 14, 15, 16, 17, 18, 19, 20, 21, 22, 23, 24, 25, 26, and 27, motion information of determined motion vector picture blocks in which the basic pixel units are located.

It should be understood that, for example, when the candidate predictive motion vectors are represented in a variable-length coding manner, a candidate predictive motion vector with higher ranking is coded by using a shorter codeword, and a candidate predictive motion vector with lower ranking is coded by using a longer codeword. Therefore, proper determining of the obtaining order of the candidate predictive motion vectors helps to select a better codeword coding scheme and improve coding performance.

In a feasible implementation, a quantity of obtained spatial candidate predictive motion vectors is preset and is consistent at the encoder side and the decoder side, or is transmitted by using a bitstream. To be specific, the first N motion vectors in an obtaining order specified in the foregoing feasible implementations are used as the obtained spatial candidate predictive motion vectors, and N is a preset value, or is obtained by decoding the bitstream by the decoder side.

In a feasible implementation, before the obtaining motion information of the to-be-obtained determined motion vector picture block each time, the method further includes: determining that the motion information of the to-be-obtained determined motion vector picture block is different from motion information of all obtained determined motion vector picture blocks. In another feasible implementation, before the obtaining motion information of the to-be-obtained determined motion vector picture block each time, the method further includes: determining that the motion information of the to-be-obtained determined motion vector picture block is available. The two feasible implementations correspond to the pruning process and the process of determining whether the determined motion vector picture block is available. Details are not described again.

S1402. Obtain first identification information, where the first identification information is used to determine target motion information from the motion information of the at least one determined motion vector picture block.

When the motion information of the at least one determined motion vector picture block obtained in step S1401 is independently used as candidate predicted motion information of the to-be-processed picture block, the first identification information indicates that the target motion information is determined from the obtained motion information of the at least one determined motion vector picture block. When the motion information of the at least one determined motion vector picture block obtained in step S1401 and other motion information (for example, time domain motion information, artificially generated motion information, or zero motion information described above) are used as the candidate predicted motion information of the to-be-processed picture block, the first identification information indicates that the target motion information is determined from all candidate predicted motion information including the obtained motion information of the at least one determined motion vector picture block. The target motion information is predicted motion information that is finally used to process the to-be-processed picture block.

In a feasible implementation, the determining the target motion information from the motion information of the at least one determined motion vector picture block includes: using one piece in the motion information of the at least one determined motion vector picture block as the target motion information, or using a combination of at least two pieces in the motion information of the at least one determined motion vector picture block as the target motion information. For example, according to the foregoing method for artificially combining a motion vector, at least two pieces in the motion information of the at least one determined motion vector picture block are combined into the target motion information.

In a feasible implementation, this step is used on the encoder side, and is used to code the to-be-processed picture block, and the obtaining first identification information includes: determining the target motion information from the motion information of the at least one determined motion vector picture block, where a smallest rate-distortion cost is used for coding the to-be-processed picture block by using the target motion information. Specifically, for various feasible implementations for obtaining an optimal candidate predictive motion vector according to a rate-distortion cost criterion, refer to the foregoing description, and details are not described again. In addition, after the determining target motion information from the motion information of the at least one determined motion vector picture block, the method further includes: coding the first identification information into a bitstream.

In a feasible implementation, the step is used on the decoder side, and is used to decode the to-be-processed picture block, and the obtaining first identification information includes: parsing a bitstream to obtain the first identification information. In addition, after the parsing a bitstream to obtain the first identification information, the method further includes: determining the target motion information from the motion information of the at least one determined motion vector picture block based on the first identification information. A step on the decoder side is reverse to a step on the encoder side, and is consistent with the step on the encoder side, and details are not further described.

S1403. Predict motion information of the to-be-processed picture block based on the target motion information.

In a feasible implementation, the predicting motion information of the to-be-processed picture block based on the target motion information includes: using the target motion information as the motion information of the to-be-processed picture block. This implementation corresponds to the merge prediction mode described above. The target motion information is directly used as the motion information of the to-be-processed picture block, and a motion vector prediction residual value, namely, an MVD, does not need to be coded or decoded (corresponding to the encoder side or the decoder side). Details are not described again.

In a feasible implementation, the motion information includes a motion vector, and the predicting motion information of the to-be-processed picture block based on the target motion information includes: obtaining second identification information, where the second identification information is used to indicate a motion vector prediction residual value of the to-be-processed picture block; and using a sum of a motion vector in the target motion information and the motion vector prediction residual value as a motion vector of the to-be-processed picture block. This implementation corresponds to the AMVP prediction mode described above. When the target motion information is used as the predicted motion information of the to-be-processed picture block, an MVD further needs to be coded or decoded (corresponding to the encoder side or the decoder side), and a sum of the predictive motion vector in the predicted motion information and the MVD is used as the motion vector of the to-be-processed picture block. Details are not described again.

It should be understood that, as described above, the motion information may further include indication information of a reference frame. A processing manner of the indication information is also described above, and details are not described again.

It should be understood that, on the encoder side, when the motion information of the to-be-processed picture block is determined according to the rate-distortion cost criterion, step S1401 needs to be completed before step S1402. To be specific, motion information of at least one determined motion vector picture block in a picture in which an obtained to-be-processed picture block is located is used as a candidate predicted motion information set (or subset), and one candidate is selected from the set as the target motion information.

On the decoder side, step S1401 and step S1402 are not performed in a fixed time order. In a feasible implementation, after S1401 of obtaining the motion information of the at least one determined motion vector picture block in the picture in which the to-be-processed picture block is located, that is, after a candidate predicted motion information set is constructed, the target motion information may be obtained from the constructed candidate predicted motion information set based on an index value obtained by parsing the bitstream in S1402. In a feasible implementation, the index value may be first obtained by parsing the bitstream in S1402, and then a quantity of pieces of candidate predicted motion information in a to-be-constructed candidate predicted motion information set is obtained according to the index value. When the quantity of the obtained candidate predicted motion information is sufficient to determine the target motion information by using the index value, to be specific, after construction of both the target motion information in the candidate predicted motion information set and the candidate predicted motion information preceding the target motion information in the set is completed, the construction of other candidate predicted motion information in the set is stopped. In a feasible implementation, S1401 and S1402 may be alternatively performed in parallel.

Figure 16:
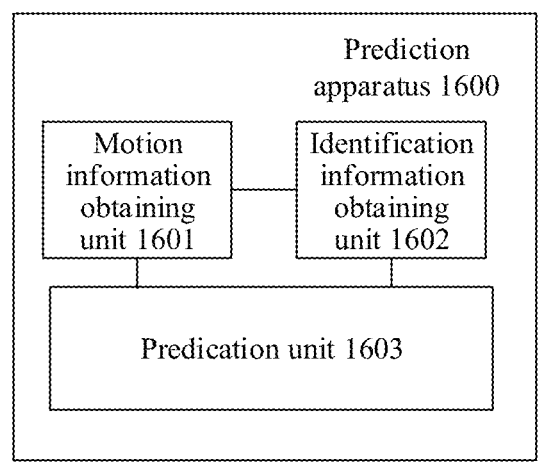
FIG. 16 is a schematic block diagram of a motion vector prediction apparatus according to an embodiment of this application.

FIG. 16 is a schematic block diagram of a motion vector prediction apparatus 1600 according to an embodiment of this application. An apparatus for predicting motion information of a picture block is used for inter-frame prediction, and includes:

a motion information obtaining unit 1601, configured to obtain motion information of at least one determined motion vector picture block in a picture in which a to-be-processed picture block is located, where the at least one determined motion vector picture block includes a determined motion vector picture block discontiguous to the to-be-processed picture block;

an identification information obtaining unit 1602, configured to obtain first identification information, where the first identification information is used to determine target motion information from the motion information of the at least one determined motion vector picture block; and a prediction unit 1603, configured to predict motion information of the to-be-processed picture block based on the target motion information.

In a feasible implementation, that the picture in which the to-be-processed picture block is located includes at least two rows of CTU, and a size of the to-be-processed picture block is not larger than a size of the coding tree unit includes: a difference between a number of a row of a coding tree unit in which the to-be-processed picture block is located in the picture and a number of a row of a coding tree unit in which the determined motion vector picture block is located in the picture is smaller than N rows, where N is an integer greater than 1.

In a feasible implementation, N is 2.

In a feasible implementation, the picture in which the to-be-processed picture block is located includes M groups of the determined motion vector picture blocks, each group of the determined motion vector picture blocks has a group number, a width of the to-be-processed picture block is w and a height is h, and the motion information obtaining unit 1601 is configured to: successively obtain the motion information of the to-be-obtained determined motion vector picture blocks in ascending order of group numbers of the to-be-obtained determined motion vector picture blocks, where determined motion vector picture blocks of a group number i include determined motion vector picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction.

In a feasible implementation, when at least two to-be-obtained determined motion vector picture blocks have a same group number, the motion information obtaining unit 1601 is configured to: successively obtain motion information of the at least two to-be-obtained determined motion vector picture blocks in ascending order of distances from the at least two to-be-obtained determined motion vector picture blocks to the origin, where the distance is a sum of a horizontal coordinate absolute value and a vertical coordinate absolute value of a pixel set basic unit in a preset position in the to-be-obtained determined motion vector picture block in the virtual coordinate system.

In a feasible implementation, the motion information obtaining unit 1601 is configured to: successively obtain motion information of determined motion vector picture blocks in which pixel set basic units in the following coordinate positions in the virtual coordinate system are located: $(-w, 0)$, $(0, -h)$, $(1, -h)$, $(-w, 1)$, $(-w, -h)$, $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

In a feasible implementation, before obtaining the motion information of the to-be-obtained determined motion vector picture block each time, the motion information obtaining unit 1601 is further configured to determine that the motion information of the to-be-obtained determined motion vector picture block is different from motion information of all obtained determined motion vector picture blocks.

In a feasible implementation, the motion information obtaining unit 1601 is configured to obtain motion information of a preset quantity of determined motion vector picture blocks.

In a feasible implementation, the prediction unit 1603 is configured to use the target motion information as the motion information of the to-be-processed picture block.

In a feasible implementation, the identification information obtaining unit 1602 is further configured to obtain second identification information, where the second identification information is used to indicate a motion vector prediction residual value of the to-be-processed picture block; and the prediction unit 1603 is configured to use a sum of a motion vector in the target motion information and the motion vector prediction residual value as a motion vector of the to-be-processed picture block.

In a feasible implementation, the apparatus 1600 is configured to decode the to-be-processed picture block, and the identification information obtaining unit 1602 is configured to parse a bitstream to obtain the first identification information.

In a feasible implementation, after parsing the bitstream to obtain the first identification information, the identification information obtaining unit 1602 is further configured to determine the target motion information from the motion information of the at least one determined motion vector picture block based on the first identification information.

In a feasible implementation, the apparatus 1600 is configured to code the to-be-processed picture block, and the identification information obtaining unit 1602 is configured to determine the target motion information from the motion information of the at least one determined motion vector picture block, where a smallest rate-distortion cost is used for coding the to-be-processed picture block by using the target motion information.

In a feasible implementation, after determining the target motion information from the motion information of the at least one determined motion vector picture block, the identification information obtaining unit 1602 is further configured to code the first identification information into a bitstream.

In a feasible implementation, the identification information obtaining unit 1602 is configured to: use one piece in the motion information of the at least one determined motion vector picture block as the target motion information, or use a combination of at least two pieces in the motion information of the at least one determined motion vector picture block as the target motion information.

Compared with a feasible implementation in which only the spatial candidate prediction mode shown in FIG. 8 is used, in a candidate prediction mode in which a motion vector of a spatially discontiguous picture block is further used as a candidate predictive motion vector of a to-beprocessed block, more spatial prior coding information is used, and coding performance is improved.

It should be understood that, in this embodiment of the present application, when a determined motion vector picture block is a to-be-processed picture block that is being predicted, and a picture block whose motion vector is determined may be a picture block that has been constructed or a picture block that has not been constructed. This is not limited.

Figure 17:
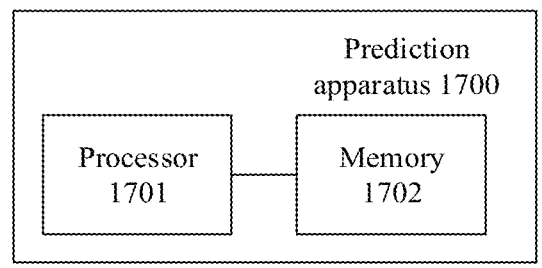
FIG. 17 is another schematic block diagram of a motion vector prediction apparatus according to an embodiment of this application.

FIG. 17 is another schematic block diagram of a motion vector prediction apparatus 1700 according to an embodiment of this application. An apparatus for predicting motion information of a picture block is used for inter-frame prediction and includes: a processor 1701 and a memory 1702 coupled to the processor.

The processor 1701 is configured to: obtain motion information of at least one determined motion vector picture block in a picture in which a to-be-processed picture block is located, where the at least one determined motion vector picture block includes a determined motion vector picture block discontiguous to the to-be-processed picture block; obtain first identification information, where the first identification information is used to determine target motion information from the motion information of the at least one determined motion vector picture block; and predict motion information of the to-be-processed picture block based on the target motion information.

In a feasible implementation, that the picture in which the to-be-processed picture block is located includes at least two rows of CTU, and a size of the to-be-processed picture block is not larger than a size of the coding tree unit includes: a difference between a number of a row of a coding tree unit in which the to-be-processed picture block is located in the picture and a number of a row of a coding tree unit in which the determined motion vector picture block is located in the picture is smaller than N rows, where N is an integer greater than 1.

In a feasible implementation, N is 2.

In a feasible implementation, the picture in which the to-be-processed picture block is located includes M groups of the determined motion vector picture blocks, each group of the determined motion vector picture blocks has a group number, a width of the to-be-processed picture block is w and a height is h, and the processor 1701 is configured to: successively obtain the motion information of the to-be-obtained determined motion vector picture blocks in ascending order of group numbers of the to-be-obtained determined motion vector picture blocks, where determined motion vector picture blocks of a group number i include determined motion vector picture blocks in which pixel set basic units in the following coordinate positions in a virtual coordinate system are located: $(-i \times w, -i \times h)$, $(1+m \times w, -i \times h)$, $(-m \times w, -i \times h)$, $(-i \times w, -m \times h)$, and $(-i \times w, m \times h+1)$, m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction.

In a feasible implementation, when at least two to-be-obtained determined motion vector picture blocks have a same group number, the processor 1701 is configured to: successively obtain motion information of the at least two to-be-obtained determined motion vector picture blocks in ascending order of distances from the at least two to-be-obtained determined motion vector picture blocks to the origin, where the distance is a sum of a horizontal coordinate absolute value and a vertical coordinate absolute value of a pixel set basic unit in a preset position in the to-be-obtained determined motion vector picture block in the virtual coordinate system.

In a feasible implementation, the processor 1701 is configured to: successively obtain motion information of determined motion vector picture blocks in which pixel set basic units in the following coordinate positions in the virtual coordinate system are located: $(-w, 0)$, $(0, -h)$, $(1, -h)$, $(-w, 1)$, $(-w, -h)$, $(-2 \times w, 0)$, $(0, -2 \times h)$, $(1, -2 \times h)$, $(-2 \times w, 1)$, $(-w, -2 \times h)$, $(-2 \times w, -h)$, $(-2 \times w, h+1)$, $(w+1, -2 \times h)$, $(-2 \times w, -2 \times h)$, $(-3 \times w, 0)$, $(0, -3 \times h)$, $(1, -3 \times h)$, $(-3 \times w, 1)$, $(-w, -3 \times h)$, $(-3 \times w, -h)$, $(w+1, -3 \times h)$, $(-3 \times w, h+1)$, $(-2 \times w, -3 \times h)$, $(-3 \times w, -2 \times h)$, $(2 \times w+1, -3 \times h)$, $(-3 \times w, 2 \times h+1)$, and $(-3 \times w, -3 \times h)$.

In a feasible implementation, before obtaining the motion information of the to-be-obtained determined motion vector picture block each time, the processor 1701 is further configured to determine that the motion information of the to-be-obtained determined motion vector picture block is different from motion information of all obtained determined motion vector picture blocks.

In a feasible implementation, the processor 1701 is configured to obtain motion information of a preset quantity of determined motion vector picture blocks.

In a feasible implementation, the processor 1701 is configured to use the target motion information as the motion information of the to-be-processed picture block.

In a feasible implementation, the processor 1701 is further configured to: obtain second identification information, where the second identification information is used to indicate a motion vector prediction residual value of the to-be-processed picture block; and use a sum of a motion vector in the target motion information and the motion vector prediction residual value as a motion vector of the to-be-processed picture block.

In a feasible implementation, the apparatus 1700 is configured to decode the to-be-processed picture block, and the processor 1701 is configured to parse a bitstream to obtain the first identification information.

In a feasible implementation, after parsing the bitstream to obtain the first identification information, the processor 1701 is further configured to determine the target motion information from the motion information of the at least one determined motion vector picture block based on the first identification information.

In a feasible implementation, the apparatus 1700 is configured to code the to-be-processed picture block, and the processor 1701 is configured to determine the target motion information from the motion information of the at least one determined motion vector picture block, where a smallest rate-distortion cost is used for coding the to-be-processed picture block by using the target motion information.

In a feasible implementation, after determining the target motion information from the motion information of the at least one determined motion vector picture block, the processor 1701 is further configured to code the first identification information into a bitstream.

In a feasible implementation, the processor 1701 is configured to: use one piece in the motion information of the at least one determined motion vector picture block as the target motion information, or use a combination of at least two pieces in the motion information of the at least one determined motion vector picture block as the target motion information.

Compared with a feasible implementation in which only the spatial candidate prediction mode shown in FIG. 8 is used, in a candidate prediction mode in which a motion vector of a spatially discontiguous picture block is further used as a candidate predictive motion vector of a to-be-processed block, more spatial prior coding information is used, and coding performance is improved.

Although specific aspects of this application have been described with reference to the video encoder 20 and the video decoder 30, it should be understood that the technologies of this application may be applied by using many other video coding and/or decoding units, processors, processing units, for example, a hardware-based coding unit of an encoder/decoder (CODEC), and the like. In addition, it should be understood that the steps shown and described in FIG. 5 are provided merely as a feasible implementation. In other words, the steps shown in the feasible implementation of FIG. 5 does not necessarily need to be performed in the order shown in FIG. 5, and fewer, additional, or alternative steps may be performed.

Further, it should be understood that depending on a feasible implementation, specific actions or events of any of the methods described in this specification may be performed in different sequences, an action or event may be added, or the actions or events may be combined, or omitted (for example, not all of the described actions or events are necessary for implementing the method). Further, in a particular feasible implementation, the actions or events may (for example) undergo multi-threading processing or interrupt processing, or may be processed by a plurality of processors simultaneously instead of successively. Further, although a particular aspect of this application is described as being performed by a single module or unit for purposes of clarity, it should be understood that the technologies of this application may be performed by a combination of units or modules associated with a video decoder.

In one or more feasible implementations, the described functions may be implemented by hardware, software, firmware, or any combination thereof. If the functions are implemented by using software, the functions may be stored in a computer readable medium as one or more instructions or code or be sent by using a computer readable medium, and be performed by using a hardware-based processing unit. The computer readable medium may include a computer readable storage medium or a communication medium. The computer readable storage medium corresponds to a tangible medium such as a data storage medium, and the communication medium includes any medium that facilitates transmission of a computer program (for example) from one position to another position according to a communications protocol.

In this manner, the computer readable medium may correspond to, for example, (1) a non-transitory tangible computer readable storage medium, or (2) a communication medium such as a signal or a carrier. The data storage medium may be any available medium that can be accessed by one or more computers or one or more processors to retrieve instructions, code, and/or data structures for implementing the technologies described in this application. A computer program product may include the computer readable medium.

By way of an implementation and not by way of limitation, the computer readable storage medium may include a RAM, a ROM, an EEPROM, a CD-ROM or another optical disc storage apparatus, a magnetic disk storage apparatus or another magnetic storage apparatus, a flash memory, or any other medium that can be used to store desired program code in a form of an instruction or a data structure and that can be accessed by a computer. In addition, any connection may be appropriately referred to as a computer readable medium. For example, if an instruction is transmitted from a website, server, or another remote source through a coaxial cable, a fiber optic cable, a twisted pair, a digital subscriber line (DSL), or wireless technologies such as infrared, radio, and microwave, the coaxial cable, fiber optic cable, twisted pair, DSL, or wireless technologies such as infrared, radio, and microwave are included in a definition of medium.

However, it should be understood that the computer readable storage medium and the data storage medium may not include a connection, a carrier, a signal, or another transitory medium, but are non-transitory tangible storage media. A disk and an optical disc used in this specification include a compact disc (CD), a lightning disc, an optical disc, a digital versatile disc (DVD), a floppy disk, and a Blu-ray disc. The disk generally magnetically reproduces data, and the optical disc optically reproduces data through lightning. A combination of the foregoing objects shall be further included in a scope of the computer readable medium.

An instruction may be executed by one or more processors such as one or more DSP, general purpose microprocessors, ASIC, FPGA, or other equivalent integrated or discrete logic circuits. Therefore, the term "processor" used in this specification may represent any one of the foregoing structures or another structure that is applicable to implement the technologies described in this specification. In addition, in some aspects, the function described in this specification may be provided in a dedicated hardware and/or software module configured for coding and decoding, or may be incorporated into a combined codec. In addition, the technologies may be completely implemented in one or more circuits or logic elements.

The technologies of this application may be implemented in a wide variety of apparatuses or devices, including a wireless mobile phone, an integrated circuit (IC), or a set (for example, a chip set) of ICs. In this application, various components, modules, and units are described to emphasize functions of an apparatus that is configured to implement the disclosed technologies, and the functions do not necessarily need to be implemented by different hardware units. More specifically, as described above, various units may be combined in a codec hardware unit or provided by a set of interoperable hardware units (including one or more processors as described above) in conjunction with suitable software and/or firmware.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for predicting motion information of a picture block, wherein the motion information is used for inter-frame prediction, and the method comprises:
    obtaining motion information of at least one determined motion vector picture block in a picture in which a to-be-processed picture block is located, wherein one

53 of the at least one determined motion vector picture block is discontiguous with the to-be-processed picture block;
constructing a list of one or more candidate motion vectors, at least one of the candidate motion vectors determined according to the motion information of at least one determined motion vector picture block discontiguous with the to-be-processed picture block; and
predicting motion information of the to-be-processed picture block based on the list of one or more candidate motion vectors;
wherein the picture in which the to-be-processed picture block is located comprises M groups of the at least one determined motion vector picture blocks, each group of the determined motion vector picture blocks has a group number, a width of the to-be-processed picture block is w and a height is h, and the step of obtaining motion information of at least one determined motion vector picture block in a picture in which a to-be-processed picture block is located comprises:
successively obtaining the motion information of to-be-obtained determined motion vector picture blocks among the at least one determined motion vector picture blocks in ascending order of group numbers of the to-be-obtained determined motion vector picture blocks, wherein determined motion vector picture blocks of a group number i comprise determined motion vector picture blocks in which pixel set basic units in the following coordinate positions in a virtual coordinate system are located at: (−i×w, −i×h), ((m×w)+1, −i×h), (−m×w, −i×h), (−i×w, −m×h), and (−i×w, (m×h)+1), m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction;
wherein at least two to-be-obtained determined motion vector picture blocks have a same group number, and the step of successively obtaining the motion information of the to-be-obtained determined motion vector picture blocks comprises:
successively obtaining motion information of the at least two to-be-obtained determined motion vector picture blocks in ascending order of distances from said at least two to-be-obtained determined motion vector picture blocks to the origin, wherein the distance is a sum of a horizontal coordinate absolute value and a vertical coordinate absolute value of a pixel set basic unit in a preset position in the to-be-obtained determined motion vector picture block in the virtual coordinate system.

2. The method according to claim 1, wherein the picture in which the to-be-processed picture block is located comprises at least two rows of coding tree units (CTUs), and a size of the to-be-processed picture block is not larger than a size of any of the CTUs, and
a difference between a number of a row of a CTU in which the to-be-processed picture block is located in the picture and a number of a row of a CTU in which the determined motion vector picture block is located in the picture is smaller than N rows, wherein N is an integer greater than 1.

3. The method according to claim 2, wherein N is 2.

4. The method according to claim 1, wherein the step of obtaining motion information of at least one determined motion vector picture block in a picture in which a to-be-processed picture block is located comprises:
successively obtaining motion information of determined motion vector picture blocks in which pixel set basic units in the following coordinate positions in the virtual coordinate system are located: (−w, 0), (0, −h), (1, −h), (−w, 1), (−w, −h), (−2×w, 0), (0, −2×h), (1, −2×h), (−2×w, 1), (−w, −2×h), (—2×w, −h), (−2×w, h+1), (w+1, −2×h), (−2×w, −2×h), (−3×w, 0), (0, −3×h), (1, −3×h), (−3×w, 1), (−w, −3×h), (−3×w, −h), (w+1, −3×h), (−3×w, h+1), (−2×w, −3×h), (−3×w, −2×h), (2×w+1, −3×h), (−3×w, 2×h+1), and (−3×w, −3×h).

5. The method according to claim 1, wherein during the step of obtaining motion information of at least one determined motion vector picture block, before each of the successive steps of obtaining motion information of the to-be-obtained determined motion vector picture block:
determining that the motion information of the to-be-obtained determined motion vector picture block is different from motion information of all previously obtained determined motion vector picture blocks.

6. The method according to claim 1, wherein the step of obtaining motion information of at least one determined motion vector picture block in a picture in which a to-be-processed picture block is located comprises:
obtaining motion information of a preset quantity of determined motion vector picture blocks.

7. An apparatus for predicting motion information of a picture block, wherein the motion information is used for inter-frame prediction, and the apparatus comprises:
a processor and a memory coupled to the processor, wherein
the processor is configured to:
obtain motion information of at least one determined motion vector picture block in a picture in which a to-be-processed picture block is located, wherein one of the at least one determined motion vector picture block is discontiguous with the to-be-processed picture block;
construct a list of one or more candidate motion vectors, at least one of the candidate motion vectors determined according to the motion information of at least one determined motion vector picture block discontiguous with the to-be-processed picture block; and
predict motion information of the to-be-processed picture block based on the list of one or more candidate motion vectors;
wherein the picture in which the to-be-processed picture block is located comprises M groups of the at least one determined motion vector picture blocks, each group of the determined motion vector picture blocks has a group number, a width of the to-be-processed picture block is w and a height is h, and the processor is configured to:
successively obtain the motion information of to-be-obtained determined motion vector picture blocks among the at least one determined motion vector picture blocks in ascending order of group numbers of the to-be-obtained determined motion vector picture blocks, wherein determined motion vector picture blocks of a group number i comprise determined motion vector picture blocks in which pixel set basic units in the following coordinate positions in a virtual coordinate system are located: (−i×w, −i×h), ((m×w)+1, −i×h), (−m×w, −i×h), (−i×w, −m×h), and (−i×w, (m×h)+1), m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction;

when at least two to-be-obtained determined motion vector picture blocks have a same group number, successively obtain motion information of the at least two to-be-obtained determined motion vector picture blocks in ascending order of distances from said at least two to-be-obtained determined motion vector picture blocks to the origin, wherein the distance is a sum of a horizontal coordinate absolute value and a vertical coordinate absolute value of a pixel set basic unit in a preset position in the to-be-obtained determined motion vector picture block in the virtual coordinate system.

8. The apparatus according to claim 7, wherein the picture in which the to-be-processed picture block is located comprises at least two rows of coding tree units (CTUs), and a size of the to-be-processed picture block is not larger than a size of any of the CTUs, that a difference between a number of a row of a CTU in which the to-be-processed picture block is located in the picture and a number of a row of a CTU in which the determined motion vector picture block is located in the picture is smaller than N rows, wherein N is an integer greater than 1.

9. The apparatus according to claim 8, wherein N is 2.

10. The apparatus according to claim 7, wherein the apparatus is used for a video encoder or a video decoder.

11. A non-transitory computer-readable storage medium storing programming for execution by a processing circuitry, wherein the programming, when executed by the processing circuitry, configures the processing circuitry to:

obtain motion information of at least one determined motion vector picture block in a picture in which a to-be-processed picture block is located, wherein one of the at least one determined motion vector picture block is discontiguous with the to-be-processed picture block;

construct a list of one or more candidate motion vectors, at least one of the candidate motion vectors determined according to the motion information of at least one determined motion vector picture block discontiguous with the to-be-processed picture block; and predict motion information of the to-be-processed picture block based on the list of one or more candidate motion vectors;

wherein the picture in which the to-be-processed picture block is located comprises M groups of the at least one determined motion vector picture blocks, each group of the determined motion vector picture blocks has a group number, a width of the to-be-processed picture block is w and a height is h, and the processing circuitry is configured to:

successively obtain the motion information of to-be-obtained determined motion vector picture blocks among the at least one determined motion vector picture blocks in ascending order of group numbers of the to-be-obtained determined motion vector picture blocks, wherein determined motion vector picture blocks of a group number i comprise determined motion vector picture blocks in which pixel set basic units in the following coordinate positions in a virtual coordinate system are located: (−i×w, −i×h), ((m×w)+1, −i×h), (−m×w, −i×h), (−i×w, −m×h), and (−i×w, (m×h)+1), m is any integer ranging from 0 to i−1 (including 0 and i−1), M, i, w, and h are positive integers, and i is not greater than M; and in the virtual coordinate system, a position of a pixel set basic unit in a lower right corner of the to-be-processed picture block in the picture is used as an origin, a straight line on which a bottom boundary of the to-be-processed picture block is located is used as a horizontal coordinate axis, a rightward direction is a horizontal positive direction, a straight line on which a right boundary of the to-be-processed picture block is located is used as a vertical coordinate axis, and a downward direction is a vertical positive direction;

when at least two to-be-obtained determined motion vector picture blocks have a same group number, successively obtain motion information of the at least two to-be-obtained determined motion vector picture blocks in ascending order of distances from said at least two to-be-obtained determined motion vector picture blocks to the origin, wherein the distance is a sum of a horizontal coordinate absolute value and a vertical coordinate absolute value of a pixel set basic unit in a preset position in the to-be-obtained determined motion vector picture block in the virtual coordinate system.

12. The non-transitory computer-readable storage medium according to claim 11, wherein the picture in which the to-be-processed picture block is located comprises at least two rows of CTUs, and a size of the to-be-processed picture block is not larger than a size of the CTU, that a difference between a number of a row of a CTU in which the to-be-processed picture block is located in the picture and a number of a row of a CTU in which the determined motion vector picture block is located in the picture is smaller than N rows, wherein N is an integer greater than 1.

13. The non-transitory computer-readable storage medium according to claim 12, wherein N is 2.

14. The non-transitory computer-readable storage medium according to claim 11, wherein the non-transitory computer-readable storage medium is used for a video encoder or a video decoder.

* * * * *